United States Patent
Joshi et al.

(10) Patent No.: US 11,341,778 B1
(45) Date of Patent: May 24, 2022

(54) AUTOMATED ADAPTIVE DISPLAYED SPOOFING

(71) Applicant: EyeVerify, Inc., Kansas City, MO (US)

(72) Inventors: Yash Joshi, Kansas City, MO (US); Matthew Barrow, Overland Park, KS (US); Reza R. Derakhshani, Shawnee, KS (US)

(73) Assignee: EyeVerify Inc., Kansas City, MO (US)

( * ) Notice: Subject to any disclaimer, the term of this patent is extended or adjusted under 35 U.S.C. 154(b) by 0 days.

(21) Appl. No.: 17/339,448

(22) Filed: Jun. 4, 2021

(51) Int. Cl.
| G06K 9/00 | (2006.01) |
| G06V 40/40 | (2022.01) |
| H04N 5/232 | (2006.01) |
| G06V 20/10 | (2022.01) |

(52) U.S. Cl.
CPC ............. G06V 40/40 (2022.01); G06V 20/10 (2022.01); H04N 5/232 (2013.01)

(58) Field of Classification Search
CPC . G06K 9/00899; G06K 9/00664; H04N 5/232
USPC ......................................................... 382/115
See application file for complete search history.

(56) References Cited

U.S. PATENT DOCUMENTS

| 8,457,367 B1* | 6/2013 | Sipe ................... G06K 9/00315 382/118 |
| 8,542,879 B1* | 9/2013 | Nechyba ............ G06K 9/00228 382/103 |
| 8,938,131 B1 | 1/2015 | Kim et al. |
| 2006/0078215 A1 | 4/2006 | Gallagher |
| 2013/0079236 A1 | 3/2013 | Holmes |
| 2013/0314388 A1 | 11/2013 | Oda |
| 2020/0134342 A1* | 4/2020 | Parupati .................. G06F 21/32 |
| 2020/0311235 A1 | 10/2020 | Storm et al. |
| 2021/0027080 A1 | 1/2021 | Storm et al. |
| 2021/0110185 A1 | 4/2021 | Rowe |
| 2021/0158509 A1 | 5/2021 | Kwak et al. |

* cited by examiner

*Primary Examiner* — Michael R Neff
(74) *Attorney, Agent, or Firm* — Fish & Richardson P.C.

(57) ABSTRACT

An adaptive spoofing method includes: causing a first display device to display a spoof representation of a human user; and obtaining multiple images of the spoof representation. The multiple images are captured automatically by an image capture device, each of the multiple images captures a different corresponding configuration of the spoof representation displayed on the first display device. The method also includes: executing a biometric authentication process separately on each of at least a subset of the multiple images; determining that the biometric authentication process authenticates the human user based on at least a first image from the subset; and identifying a configuration of the spoof representation corresponding to the first image as a failure condition associated with the biometric authentication process.

20 Claims, 20 Drawing Sheets

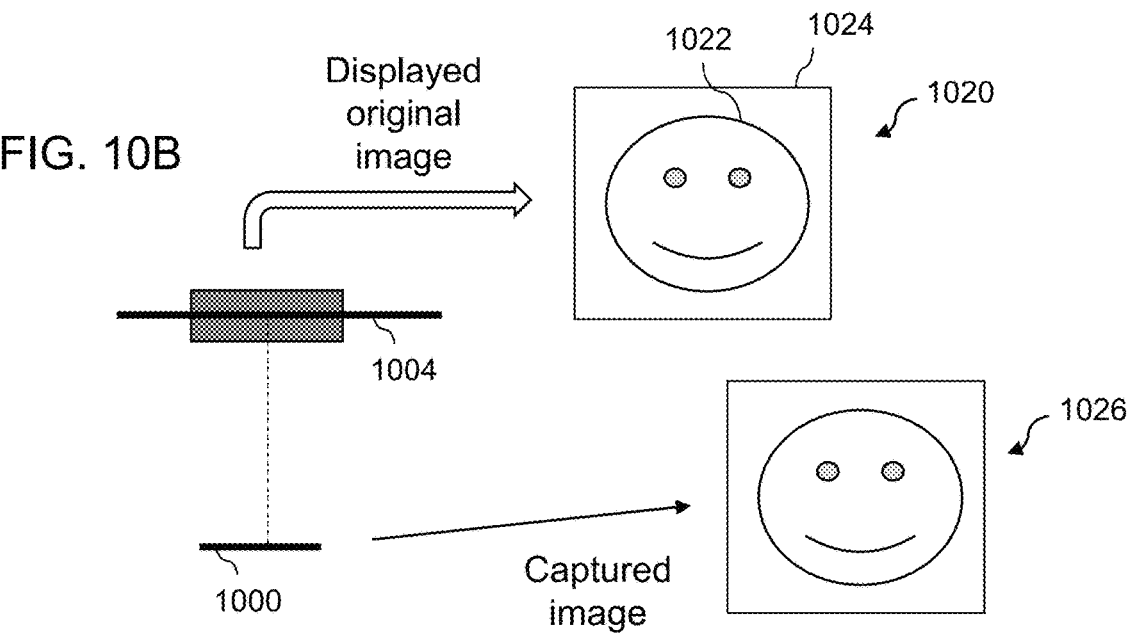
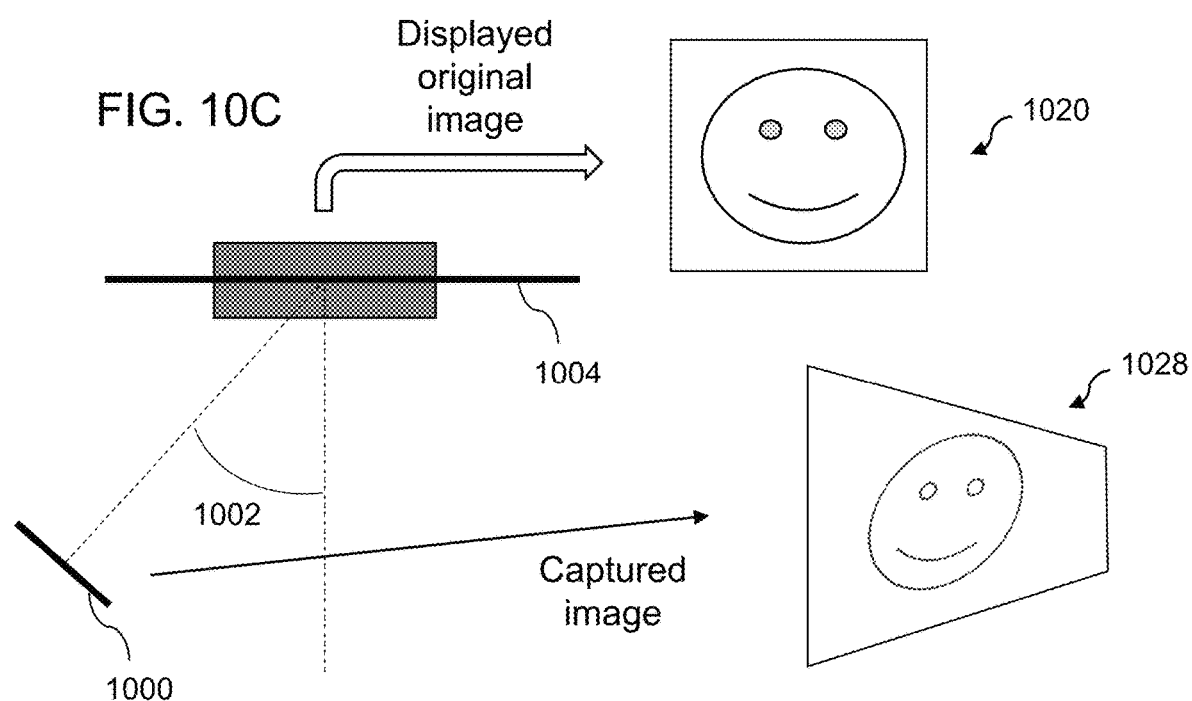

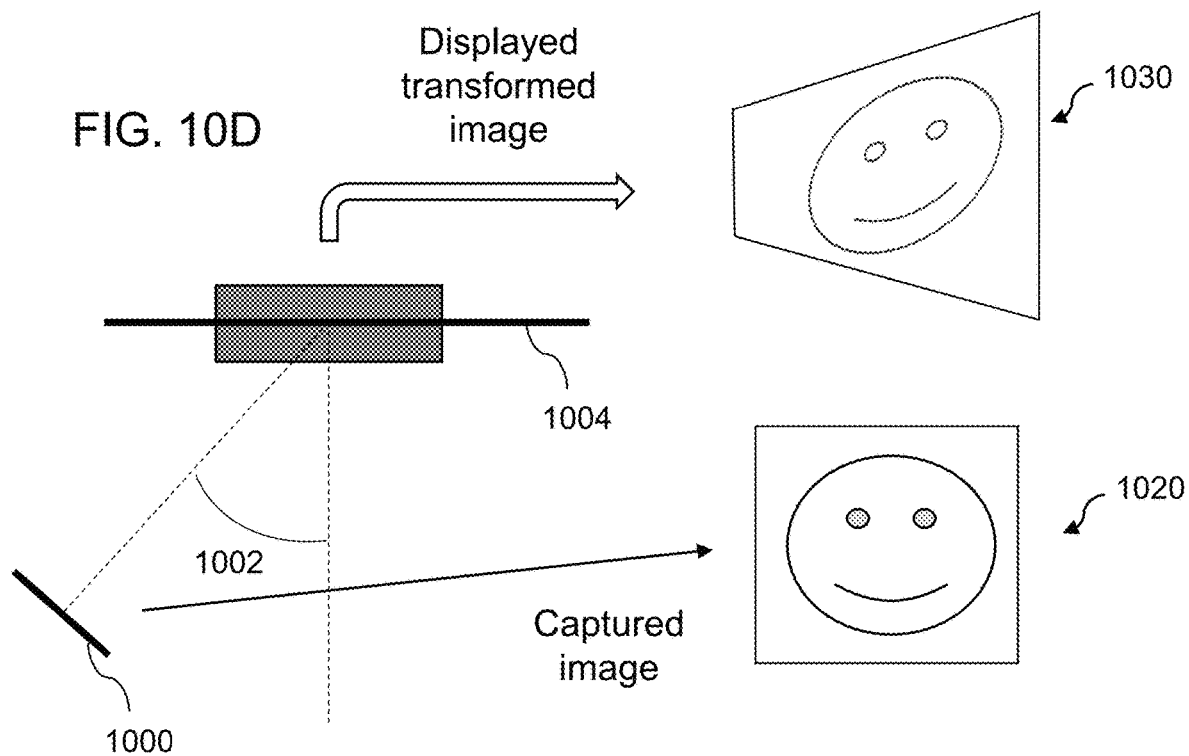

AUTOMATED ADAPTIVE DISPLAYED SPOOFING

FIELD OF THE DISCLOSURE

The present disclosure relates to spoofing of biometric authentication processes.

BACKGROUND

Systems incorporating a biometric identification technology such as face recognition or iris recognition often include a camera that captures an image of a user. The captured image can be then processed to authenticate the user using the biometric identification technology.

SUMMARY

In one aspect, the present disclosure describes a computer-implemented method for adaptive spoofing. The method includes obtaining multiple images of a spoof representation of a human user. The multiple images are captured automatically by an image capture device, and each of the multiple images is captured at a different relative position between the image capture device and the spoof representation. The method also includes executing a biometric authentication process separately on each of at least a subset of the multiple images; determining that the biometric authentication process authenticates the human user based on at least a first image from the subset; and identifying a relative position between the image capture device and the spoof representation corresponding to the first image as a failure condition associated with the biometric authentication process.

Another aspect of the present disclosure describes a system. The system includes an image capture device, a spoof representation of a human user, a movement mechanism configured to move the image capture device, the spoof representation, or both, and a computer system configured to perform operations. The operations include obtaining multiple images of the spoof representation of a human user. The multiple images are captured automatically by the image capture device, and each of the multiple images is captured at a different relative position between the image capture device and the spoof representation. The operations also include: executing a biometric authentication process separately on each of at least a subset of the multiple images; determining that the biometric authentication process authenticates the human user based on at least a first image from the subset; and identifying a relative position between the image capture device and the spoof representation corresponding to the first image as a failure condition associated with the biometric authentication process.

Another aspect of the present disclosure describes a non-transitory, computer-readable storage medium storing one or more instructions that, when executed by a computer system, cause the computer system to perform operations. The operations include obtaining multiple images of a spoof representation of a human user. The multiple images are captured automatically by an image capture device, and each of the multiple images is captured at a different relative position between the image capture device and the spoof representation. The operations also include: executing a biometric authentication process separately on each of at least a subset of the multiple images; determining that the biometric authentication process authenticates the human user based on at least a first image from the subset; and identifying a relative position between the image capture device and the spoof representation corresponding to the first image as a failure condition associated with the biometric authentication process.

Any of these aspects, or other aspects described throughout this disclosure, may include any one or more of at least the following features and characteristics.

In some implements, the spoof representation of the human user includes an image displayed on a monitor, a printed image, or a three-dimensional representation.

In some implementations, one or more parameters associated with capture of the first image are obtained, the one or more parameters representing at least one of ambient lighting or a configuration of the spoof representation. The one or more parameters are identified as a portion of the failure condition associated with the biometric authentication process.

In some implementations, movement of at least one of the image capture device or the spoof representation is caused to set the different relative positions corresponding to the multiple images. In some implementations, an image of the image capture device is obtained. The movement of at least one of the image capture device or the spoof representation is based on the image of the image capture device.

In some implementations, one or more marking features on the image capture device are identified in the image of the image capture device. A position of the image capture device is determined based on the one or more marking features. The movement of at least one of the image capture device or the spoof representation is based on the identified position of the image capture device.

In some implementations, the image capture device includes a display. A field of view of the image capture device is identified presented on the display in the image of the image capture device. The movement of at least one of the image capture device or the spoof representation is based on the identified field of view presented on the display. In some implementations, authentication instructions presented on the display in the image of the image capture device are identified. A configuration of the spoof representation is adjusted based on the identified authentication instructions presented on the display.

In some implementations, the image capture device includes a mobile device.

In some implementations, a robotic manipulator is caused to interact with the image capture device. The interaction causes the image capture device to capture the first image.

In some implementations, a vibration of the image capture device is caused to simulate the vibrations of a handheld device.

In another aspect, the present disclosure describes another computer-implemented method for adaptive spoofing. The method includes: causing a first display device to display a spoof representation of a human user; and obtaining multiple images of the spoof representation. The multiple images are captured automatically by an image capture device, and each of the multiple images captures a different corresponding configuration of the spoof representation displayed on the first display device. The method also includes: executing a biometric authentication process separately on each of at least a subset of the multiple images; determining that the biometric authentication process authenticates the human user based on at least a first image from the subset; and identifying a configuration of the spoof representation corresponding to the first image as a failure condition associated with the biometric authentication process.

Another aspect of the present disclosure describes another system. The system includes a first display device, an image capture device, and a computer system configured to perform operations. The operations include causing the first display device to display a spoof representation of a human user; and obtaining multiple images of the spoof representation. The multiple images are captured automatically by the image capture device, and each of the multiple images captures a different corresponding configuration of the spoof representation displayed on the first display device. The operations also include executing a biometric authentication process separately on each of at least a subset of the multiple images; determining that the biometric authentication process authenticates the human user based on at least a first image from the subset; and identifying a configuration of the spoof representation corresponding to the first image as a failure condition associated with the biometric authentication process.

Another aspect of the present disclosure describes another non-transitory, computer-readable storage medium storing one or more instructions that, when executed by a computer system, cause the computer system to perform operations. The operations include: causing a first display device to display a spoof representation of a human user; and obtaining multiple images of the spoof representation. The multiple images are captured automatically by an image capture device, and each of the multiple images captures a different corresponding configuration of the spoof representation displayed on the first display device. The operations also include: executing a biometric authentication process separately on each of at least a subset of the multiple images; determining that the biometric authentication process authenticates the human user based on at least a first image from the subset; and identifying a configuration of the spoof representation corresponding to the first image as a failure condition associated with the biometric authentication process.

Any of these aspects, or other aspects described throughout this disclosure, may include any one or more of at least the following features and characteristics.

In some implementations, the different corresponding configurations include at least one of: a zoom level of the spoof representation, a position of the spoof representation on the first display device, an action performed by the spoof representation, or a lighting environment of the spoof representation.

In some implementations, the different corresponding configurations include at least one of: a brightness of the display, a contrast of the display, or a color temperature of the display.

In some implementations, an image of the image capture device is obtained. The different corresponding configurations of the spoof representation are based on the image of the image capture device.

In some implementations, the image capture device includes a second display device, and the first display device includes one or more marking features. A field of view of the image capture device displayed on the second display device is identified in the image of the image capture device. One of the different corresponding configurations is set based on a position of the one or more marking features in the field of view.

In some implementations, the image capture device includes a second display device. Authentication instructions displayed on the second display device are identified in the image of the image capture device. One of the different corresponding configurations is set based on the identified authentication instructions.

In some implementations, a robotic manipulator is caused to interact with the image capture device. The interaction causes the image capture device to capture the first image.

In another aspect, the present disclosure describes a computer-implemented image transformation method. The method includes: causing a first display device to display one or more calibration patterns; and obtaining one or more first images displayed on the first display device, each of the one or more first images including a corresponding calibration pattern of the one or more calibration patterns. The one or more first images are captured by an image capture device disposed at a non-zero capture angle with respect to the first display device. The method also includes determining based on the one or more first images, a transformation to be applied to account for the non-zero capture angle; obtaining a second image of a human user; applying the transformation to the second image to generate a transformed spoof representation of the human user for capture by the image capture device being held at the non-zero capture angle with respect to the first display device; and causing the first display device to display the transformed spoof representation.

Another aspect of the present disclosure describes another system. The system includes a first display device, an image capture device, and a computer system configured to perform operations. The operations include: causing the first display device to display one or more calibration patterns; and obtaining one or more first images displayed on the first display device, each of the one or more first images including a corresponding calibration pattern of the one or more calibration patterns. The one or more first images are captured by the image capture device disposed at a non-zero capture angle with respect to the first display device. The operations also include determining, based on the one or more first images, a transformation to be applied to account for the non-zero capture angle; obtaining a second image of a human user; applying the transformation to the second image to generate a transformed spoof representation of the human user for capture by the image capture device being held at the non-zero capture angle with respect to the first display device; and causing the first display device to display the transformed spoof representation.

Another aspect of the present disclosure describes another non-transitory, computer-readable storage medium storing one or more instructions that, when executed by a computer system, cause the computer system to perform operations. The operations include: causing a first display device to display one or more calibration patterns; and obtaining one or more first images displayed on the first display device, each of the one or more first images including a corresponding calibration pattern of the one or more calibration patterns. The one or more first images are captured by an image capture device disposed at a non-zero capture angle with respect to the first display device. The operations also include determining, based on the one or more first images, a transformation to be applied to account for the non-zero capture angle; obtaining a second image of a human user; applying the transformation to the second image to generate a transformed spoof representation of the human user for capture by the image capture device being held at the non-zero capture angle with respect to the first display device; and causing the first display device to display the transformed spoof representation.

Any of these aspects, or other aspects described throughout this disclosure, may include any one or more of at least the following features and characteristics.

In some implementations, the transformation causes the transformed spoof representation to appear to be the second image, from the perspective of the image capture device being held at the non-zero capture angle with respect to the first display device.

In some implementations, determining the transformation includes determining a transformation matrix.

In some implementations, the transformation causes an apparent capture angle of the image capture device with respect to the first display device to be less than an actual capture angle of the image capture device with respect to the first display device.

In some implementations, a correspondence between a feature included in the one or more first images and a corresponding calibration pattern of the one or more calibration patterns is identified.

In some implementations, causing the first display device to display the one or more calibration patterns includes causing the first display device to display a plurality of calibration patterns in sequence.

In some implementations, based on the one or more first images, boundaries of a field of view of the image capture device are determined.

In some implementations, determining the transformation includes determining a mapping between a field of view of the image capture device and locations on the first display device.

In some implementations, the mapping is between one or more corners of the field of view and one or more corresponding locations on the first display device.

In some implementations, movement of the image capture device with respect to the first display device is caused based on the one or more first images.

Implementations of the subject matter described in this specification can be implemented to realize one or more of at least the following advantages. In some implementations, testing of biometric authentication processes can be carried out more quickly. In some implementations, testing of biometric authentication processes can be carried out more accurately. In some implementations, testing of biometric authentication processes can be carried out more repeatedly. In some implementations, a larger number of adjustable spoofing parameters can be simultaneously tested against a biometric authentication process. Distortion of spoof representations by viewing angles can be accounted for.

The details of one or more implementations are set forth in the accompanying drawings and the description below. Other aspects, features and advantages will be apparent from the description and drawings, and from the claims.

BRIEF DESCRIPTION OF THE DRAWINGS

FIGS. 10A-10D are top views of example automatic spoofing systems and associated images.

DETAILED DESCRIPTION

Biometric authentication systems can authenticate a user of a secure system based on recognizing the user's face, eye-print, iris, etc. Such biometric authentication systems involve capturing one or more images of the user and executing corresponding recognition processes on the captured image. Malicious attempts to breach the security of such biometric authentication systems can include presenting an alternative representation of a live person to gain access to an account or other privileges associated with the identity of the corresponding live person. The alternative representation may take the form of an image presented on a monitor, a printed image, a three-dimensional representation (e.g., a facial model or mask), or another object. Such attacks are generally known as spoof attacks, and the reliability/security of a biometric authentication system can be determined by the ability of the system to differentiate between a live person and corresponding alternative representations (also referred to as spoofs or spoof representations).

The precise parameters of a spoofing attempt can determine the success of the spoofing attempt in ways that may not be easy to predict a priori. For example, subtle differences in spoof positioning and orientation can make the difference between a failed spoofing attempt (e.g., a determination that the subject is an alternative representation of a live person or a determination that the subject is not an authorized subject) and a successful one.

Therefore, in order to experimentally stress-test various biometric authentication processes, implementations of the present disclosure use moving robotic devices and/or adaptive image recognition to automatically adapt to different biometric authentication processes and test the biometric authentication processes to identify their failure points with respect to various parameters. For example, the technology described herein can be used to test the capability of a facial recognition process to identify spoof representations (e.g., printed photographs or high resolution images displayed on a screen) when such spoof representations are presented, in an automated process, at various illumination levels and distance/angle combinations with respect to the mobile device on which the facial recognition process is executing. If the process fails to identify the spoof in certain instances, the illumination level and the distance/angle combination with respect to the mobile device can be identified as a failure point for the facial recognition process. The knowledge of such failure points can potentially help developers to improve the performance of the facial recognition process. By allowing for automatically and efficiently testing the robustness of a biometric process against spoofing attacks over a combination of various parameters, the technology described herein can potentially identify specific failure points that may not be easily detectable otherwise.

Figure 1:
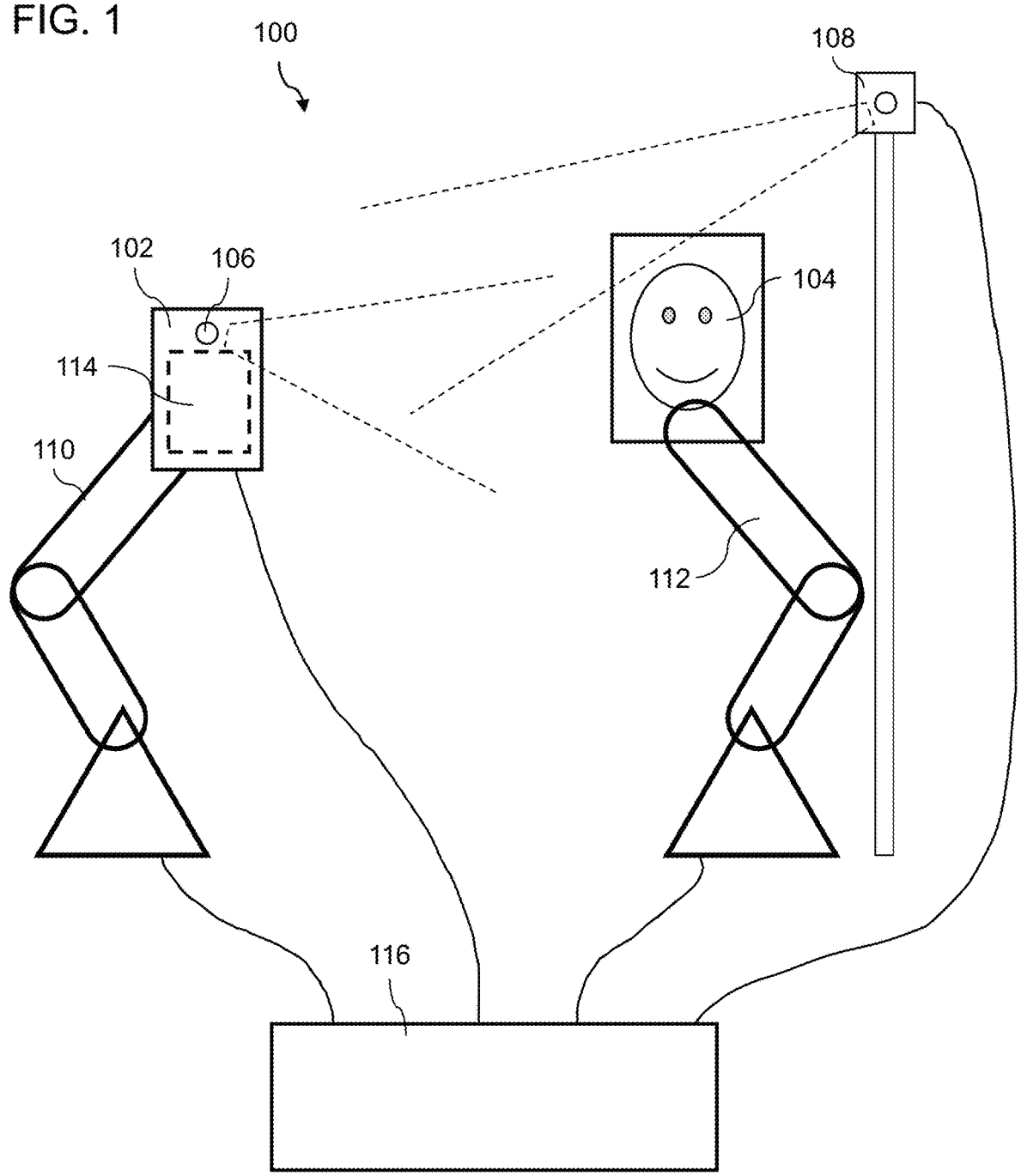
FIG. 1 is a schematic showing an example automatic spoofing system.

As shown in FIG. 1, an example automatic spoofing system 100 includes a spoof capture device 102 and a spoof representation 104 of a human user. The spoof capture device 102 includes a camera 106 configured to capture images of the spoof representation 104. A second capture device 108 is configured to capture images of the spoof capture device 102.

In general operation, and as described in more detail throughout this disclosure, the spoof capture device 102 is used to capture one or more images of the spoof representation 104 with various modifiable parameters (e.g., relative position, spoof representation configuration, etc.). The one or more images are used to test biometric authentication processes, e.g., are passed as inputs to biometric authentication systems. If the biometric authentication system authenticates one of the images, the parameters corresponding to that image are identified as a failure condition associated with the biometric authentication process being tested.

In this example, the spoof capture device 102 is mounted on a first movement mechanism 110, and the spoof representation 104 is mounted on a second movement mechanism 112. The movement mechanisms 110, 112 are movable with respect to one another, and, in various implementations, may be usable to pan, rotate, tilt, and/or otherwise move the spoof capture device 102 and the spoof representation 104. Further details on some example movement mechanisms are disclosed below in reference to FIG. 8A The example shown in FIG. 1 includes two movement mechanisms 110, 112. However, in some implementations, only one movement mechanism is included, such that the relative position of the spoof capture device 102 and the spoof representation 104 is changed by moving only one of the spoof capture device 102 or the spoof representation 104.

In addition, in some implementations, no movement mechanism is included, and spoof parameters besides relative position are tested by other means. Details of such implementations are disclosed in reference to FIG. 2 and throughout this disclosure.

The spoof representation 104 may take any one or more of a variety of forms. In some implementations, the spoof representation 104 includes a two-dimensional representation, e.g., a printed image of a human face. In some implementations, the spoof representation 104 includes a three-dimensional representation, e.g., a model of a human face. In some implementations, the spoof representation 104 includes an image or a video presented on a display monitor. Different types of spoof representation may be more or less useful for attempting to spoof different biometric authentication processes. For example, a three-dimensional representation may pass a depth test associated with a first biometric authentication process, whereas a moving image on a display monitor may be able to perform requested live actions in order to pass a second biometric authentication process.

Although this disclosure generally describes spoof representations in terms of facial spoof representations, other types of spoof representations are within the scope of this disclosure. For example, spoof representations of human eyes may be employed to test ocular biometric authentication processes.

The spoof capture device 102 also may take various forms in different implementations. In some implementations, the spoof capture device 102 is a mobile electronic device, e.g., a smartphone, a tablet, or a wearable device, including, in some implementations, a display 114. A mobile electronic device acting as the spoof capture device 102 may locally run biometric authentication software to implement biometric authentication processes under test, e.g., as an application on the mobile electronic device. Such implementations may be useful for testing biometric authentication processes in real-world conditions, e.g., using consumer devices that would actually be performing the biometric authentication processes on real users.

However, in some implementations, the spoof capture device 102 is a different type of device, e.g., a kiosk device, a custom-built capture device, or a device that primarily includes the camera 106. Spoof test images captured by the spoof capture device 102, instead of or in addition to being tested against biometric authentication processes running on the spoof capture device 102, may be transferred off of the spoof capture device 102 and tested on another device, e.g., on a control system 116 or on a remote system.

The control system 116 is communicatively coupled to one or more other components of the automatic spoofing system 100, and may be local to the other components, remote from them, or both. The couplings may be wired and/or wireless, e.g., using WiFi, Bluetooth, or other known electronic communication methods.

In operation, in some implementations, the control system 116 is configured to transmit commands to other components of the automatic spoofing system 100 in order to set spoof parameters of the automatic spoofing system 100. For example, the control system 116 may send movement commands to either or both of the movement mechanisms 110, 112 to set a relative position of the spoof capture device 102 and the spoof representation 104, and may also send a command to the spoof capture device 102 (or to a robotic manipulator associated with the spoof capture device 102, as described in more detail below) to cause the spoof capture device 102 to capture an image of the spoof representation 104.

The image may be tested against a biometric authentication process running on the spoof capture device 102, received at and tested on the control system 116 and/or on a remote system, or both, and a result of the biometric authentication process determined. The result may be a result obtained on the control system 116, a result obtained on the spoof capture device 102 and transmitted to the control system 116 by the spoof capture device 102, and/or a result obtained on the spoof capture device 102 and identified in a second image captured by the second capture device 108.

If the tested biometric authentication process authenticates the image, the spoof parameters associated with the image may be identified as a failure condition of the biometric authentication process. That is, it may be determined that the biometric authentication process fails when presented with the particular combination of spoof parameters associated with the image. The authentication of a spoof image can be referred to as a "spoof accept event," because the tested system has accepted the spoof as authentic.

Other combinations of spoof parameters may be tested by varying the parameters, capturing further images, and testing the further images.

In some implementations, when the image is tested against a biometric authentication process, a result is a numerical score (e.g., from 0 to 1 or from −1 to 1) indicating a degree of success or failure of the biometric authentication process. In some implementations, a numerical score greater than or less than a predetermined threshold is indicative of passing or failing. The predetermined threshold may be determined theoretically and/or empirically.

In some implementations, the numerical score is fused with one or more other scores, e.g., as a weighted combination, to determine an overall biometric authentication result. For example, a first numerical score may indicate a spoofing likelihood, a second numerical score may indicate a biometric matching likelihood (e.g., likelihood that a facial image matches a reference facial image for a user), and the two scores can be combined in a weighted combination that indicates overall biometric authentication success or failure in reference to a threshold value.

In various situations, it may be that an entire combination of spoof parameters is necessary for a failure condition to be met (for the biometric authentication process to be successfully spoofed), or a subset of the spoof parameters may be primarily responsible for failure of the biometric authentication process. In order to differentiate between these and other possibilities, the control system 116 may be configured to perform searches across an entire space of spoof parameters.

For example, in some implementations, the control system 116 is configured to perform a grid search in an n-dimensional search space, where n is a number of spoof parameters adjustable in the automatic spoof system 100. Examples of spoof parameters are described throughout this disclosure.

To provide one simple, non-limiting example, a spoof system is configured to adjust a) a distance between the spoof capture device and the spoof representation between ten centimeters (cm) and thirty cm in one cm increments, b) a tilt angle of the spoof representation with respect to the spoof capture device between zero degrees and sixty degrees in one degree increments, and c) an ambient lighting brightness in which the spoof representation is illuminated, with ten different brightness levels. The control system causes one or more images to be captured for each combination of the parameters, that is, for 20×60×10=12,000 different parameter combinations, and the resulting one or more images for each parameter combination are tested against a biometric authentication process.

At the conclusion of a search process, a failure space is determined, the failure space including parameters combinations determined to generate a failure condition for the biometric authentication process. For example, in the example above, a failure space might include (15≤distance≤20, 45≤angle≤55, 1≤brightness≤2) and (22≤distance≤26, 40≤angle≤50, 8≤brightness≤10).

More sophisticated search strategies are also within the scope of this disclosure, e.g., using random configuration selection (e.g., selecting a random positional parameter for each image capture), adaptive grid spacing to fine-tune ranges of a failure space, and/or other methods. In some implementations, the search includes a greedy search in which parameters are adjusted to find locally more effective spoof parameter combinations. In some implementations, the search includes a gradient search in which one or more of the spoof parameters is adjusted slightly, spoof detection results are obtained (e.g., corresponding numerical scores indicative of spoofing), and the spoof detection results are used to calculate a gradient vector of the spoof parameters; spoof parameters can then be adjusted in the opposite direction of the gradient vector (e.g., in a gradient descent optimization process), with the process iterated repeatedly to converge on spoof parameters that generate a failure condition, e.g., a spoof accept event. In some implementations, the search includes a genetic algorithm approach in which numerical scores are calculated for multiple random initial sets of spoof parameters, offspring sets of spoof parameters are created by applying mutation and/or recombination operators to the initial and following sets of spoof parameters, and the process iterated repeatedly until spoof parameters that generate a failure condition (e.g., a spoof accept event) are found.

Other optimization methods are also within the scope of this disclosure, e.g., particle swarm optimization and/or simulated annealing.

Many spoof parameters may be adjusted for capture of test images of the spoof representation. Examples of spoof parameters may include any one or more of at least the following. Other examples of spoof parameters, combinable with any or all of the examples set forth here, are described throughout this disclosure.

In some implementations, the spoof parameters include a relative position between the spoof capture device and the spoof representation. The relative position may include distance, orientation (e.g., angle of capture), position of the spoof representation in a field of view of the camera of the spoof capture device, and/or another positional parameter.

In some implementations, the spoof parameters include a lighting environment under which the images are captured, including brightness, lighting angle(s) (e.g., a face illuminated straight-on compared a face illuminated from below), lighting color, and/or another lighting parameter. The lighting environment may be controlled by adjusting an on/off state, position, intensity, and/or emission wavelength of one or more lighting elements, e.g., lightbulbs, and/or by moving blocking elements (e.g., curtains) to control illumination.

In some implementations, the spoof parameters include a configuration of the spoof representation. For example, the spoof representation may be configurable between two or more different poses/actions, e.g., smiling or frowning, blinking, and/or micro-movements. Some biometric authentication processes may search for facial movements as part of their anti-spoofing functionality, making movement functionality potentially important for identifying failure conditions.

In some implementations, the control system 116 controls the spoof capture device 102 and/or spoof representation 104 using a networking procedure. The control system 116 creates an internal server (e.g., an HTTP server) configured to receive images captured by the spoof capture device. The control system 116 also saves its IP address and corresponding port on the spoof capture device 102 and communicates with the spoof capture device 102 (e.g., commands the spoof capture device and/or receives images and other data from the spoof capture device) over a connection corresponding to the IP address and port using the internal server.

Figure 2A:
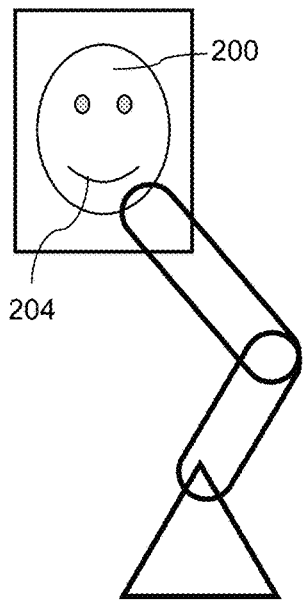
FIGS. 2A-2C are schematics showing an example of automatic spoofing system reconfiguration.
Figure 2B:
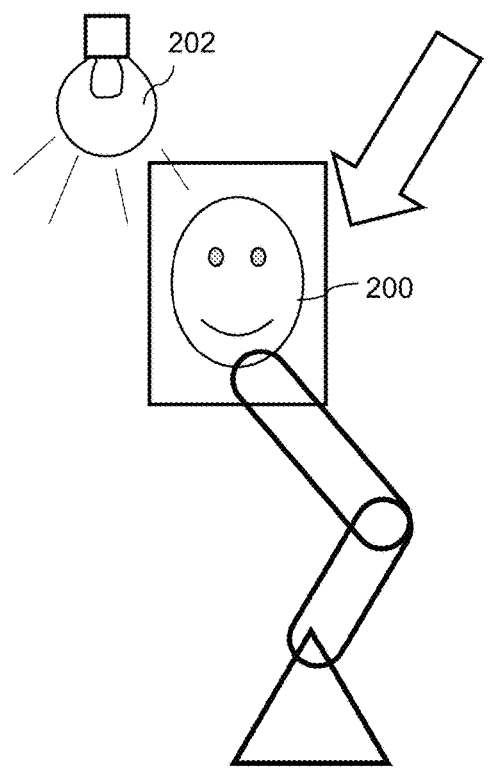
Figure 2C:
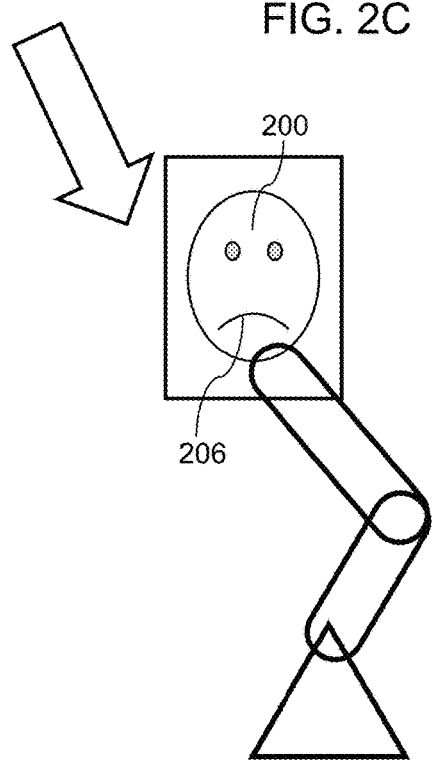

FIGS. 2A-2C show examples of spoof parameter adjustment. A spoof representation 200 is in a first configuration in FIG. 2A. In FIG. 2B, a lighting environment of the spoof representation 200 has been adjusted by enabling a lighting element 202 (e.g., controlled by a control system). In FIG.

2C, a pose parameter of the spoof representation 200 has been adjusted from a smile 204 (shown in FIG. 2A) to a frown 206.

Figure 3:
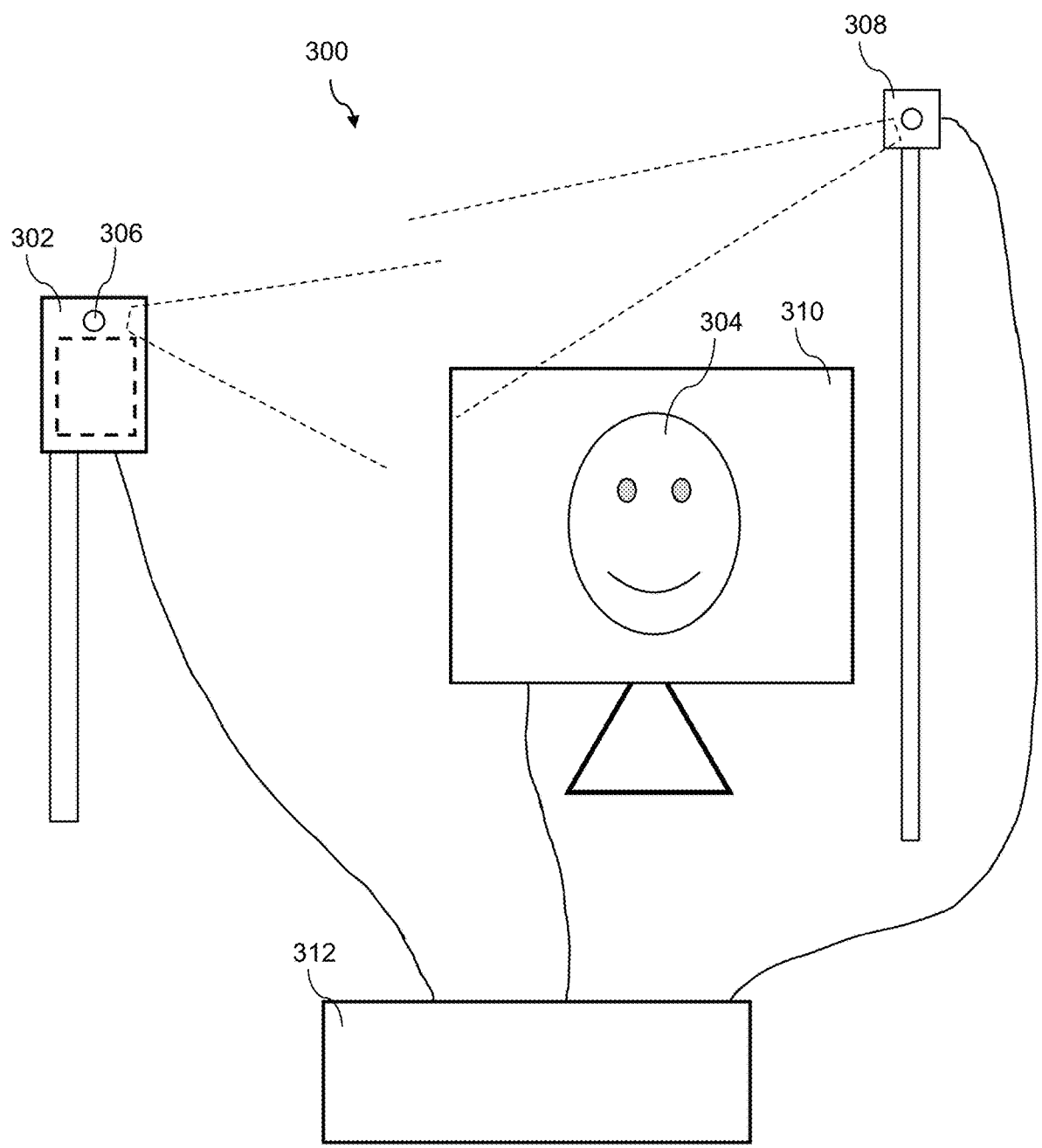
FIG. 3 is a schematic showing an example automatic spoofing system

FIG. 3 shows another example automatic spoofing system 300. The automatic spoofing system 300 includes a spoof capture device 302 including a camera 306, a spoof representation 304, a control system 312, and a second capture device 308. Except where indicated otherwise, each of these components may operate substantially or entirely as described for corresponding components of the automatic spoofing system 100.

Unlike the example automatic spoofing system 100, the example automatic spoofing system 300 does not include movement mechanisms. Rather, in this example, the spoof representation 304 is presented on a display monitor 310, e.g., a computer monitor or television.

Because it is presented on the display monitor 310, the spoof representation 304 is highly configurable and therefore, in some implementations, adjustable over many different spoof parameters.

For example, in some implementations, the spoof representation 304 performs real-time actions as spoof parameters, e.g., eye movements and/or facial movements. The spoof representation 304 may include a recorded video of a person. The spoof representation 304 may perform actions in response to instructions from the biometric authentication process, as described in more detail throughout this disclosure. Video implementations of the spoof representation 304 may be useful when the biometric authentication process includes motion-based liveness detection.

Spoof parameters for the spoof representation 304 may include a position of the spoof representation 304 on the display monitor 310, a zoom level of the spoof representation 304 on the display monitor 310 (e.g., a size of the spoof representation 304), a simulated angle of the spoof representation 304 with the respect to the spoof capture device 302, and/or another positional parameter of the spoof representation 304 with respect to the display monitor 310 and/or the spoof capture device 302.

Spoof parameters for the spoof representation 304 may instead, or additionally, include a background of the display monitor 310 on which the spoof representation 304 is presented or a simulated lighting environment of the spoof representation 304 as presented on the display monitor 310. For example, the display monitor 310 may be controlled (e.g., by the control system 312 or by another computing module) to display a simulated environment that includes the spoof representation 304 along with simulated lighting elements to produce simulated directional lighting, shadows, etc., in interaction with the spoof representation 304. A real-world lighting environment in which the display monitor 310 is placed may instead, or additionally, be adjustable as described throughout this disclosure, e.g., to determine whether glare off the display monitor 310 affects success or failure of the biometric authentication process.

Spoof parameters for the spoof representation 304 may instead, or additionally, include display parameters of the display monitor 310. The display parameters may include, for example, a display brightness, a display contrast, and/or a color temperature of the display.

Note that a spoof representation presented on a display monitor may be used in conjunction with a movement mechanism that moves the spoof capture device in real space, a movement mechanism that moves the spoof representation in real space, or both, as shown in FIG. 1.

Both example automatic spoofing systems 100, 300 are shown as including a second capture device 108, 308. Some examples of automatic spoofing systems do not include a second capture device, as described in more detail in reference to FIG. 9. However, when a second capture device is included, images captured by the second capture device can serve useful functions.

Figure 4A:
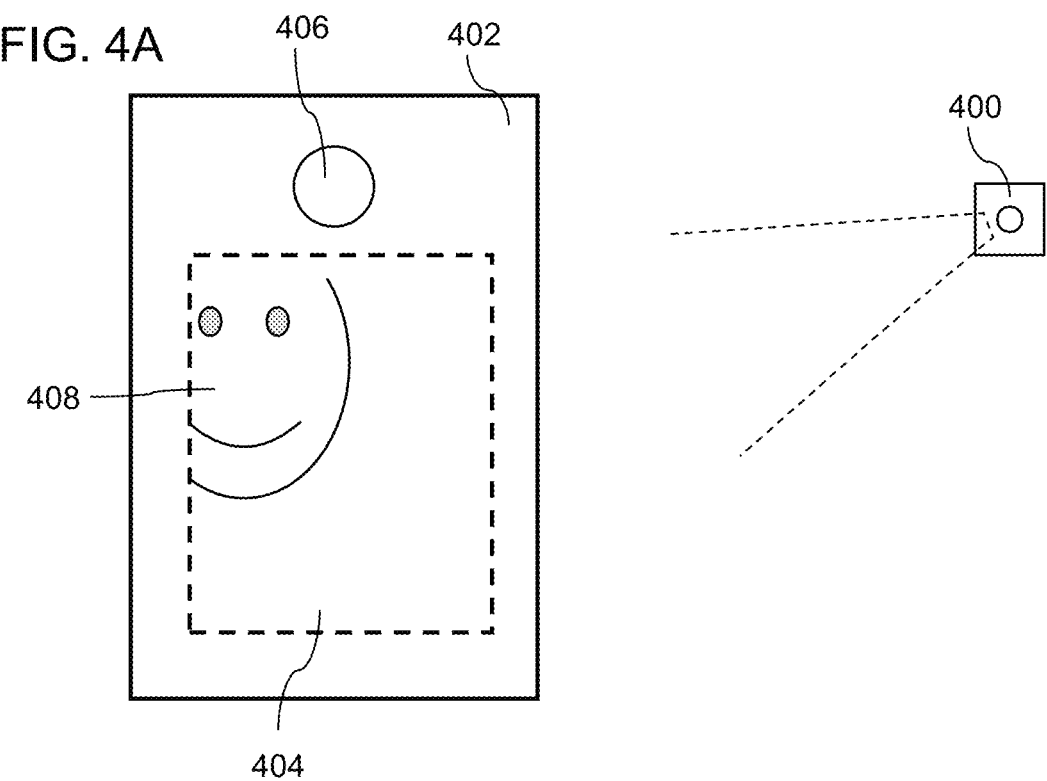
FIGS. 4A-4B are schematics showing an example of automatic spoofing system reconfiguration.
Figure 4A:
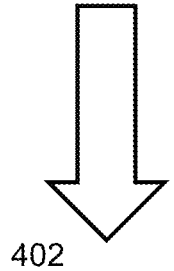
Figure 4B:
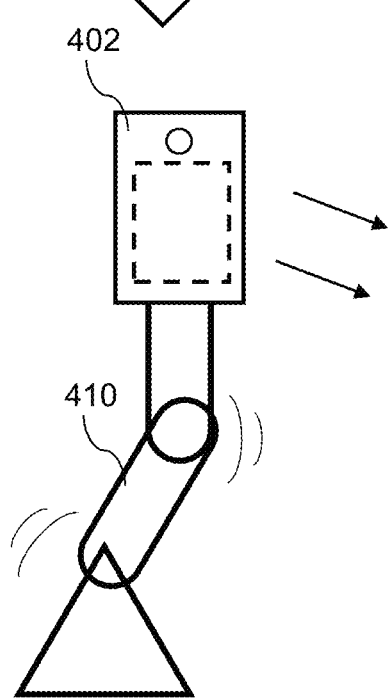

FIGS. 4A-4B shows an example process using a second capture device 400. The second capture device 400 is arranged and configured to capture images of the spoof capture device 402. The spoof capture device 402 includes a display 404 that, in this example, shows some or all of a field of view captured by a camera 406 of the spoof capture device 402. A spoof representation 408, as imaged by the camera 406, is presented on the display 404. Images of the spoof capture device 402, as captured by the second capture device 400, are analyzed (e.g., by a control system or by another system), and system parameters (e.g., spoof parameters) are correspondingly adjusted.

In this example, based on an image of the spoof capture device 402 captured by the second capture device 400, a position of the spoof representation 408 in the field of view of the camera 406 is determined, and a configuration of the automatic spoofing system may be correspondingly adjusted. For example, as shown in FIG. 4A, it may be determined that the spoof representation 408 is partially out of the field of view of the camera 406, resulting in image cutoff. Therefore, as shown in FIG. 4B, a movement mechanism 410 may be adjusted to move the spoof capture device 402 to a calculated new location (e.g., using forward or inverse kinematics calculations) such that the spoof representation 408 is more fully in the field of view. Additionally, or alternatively, a second movement mechanism (not shown) may move the spoof representation 408 in order to place the spoof representation more fully within the field of view, and/or a position of the spoof representation 408 in a display monitor on which the spoof representation 408 is presented may be adjusted, etc., depending on the implementation.

In some implementations, the display 404 of the spoof capture device 402 presents a region of interest in which the spoof representation 408 should be positioned, e.g., a box in the center of the field of view of the camera 406. The image of the spoof capture device 402 may be analyzed to identify the region of interest and correspondingly adjust the relative position of the spoof representation 408 with respect to the spoof capture device 402.

Image analysis may be performed using known techniques, e.g., computer vision methods, optical character recognition, trained machine learning models, application-specific image analysis algorithms, or a combination thereof.

Figure 5A:
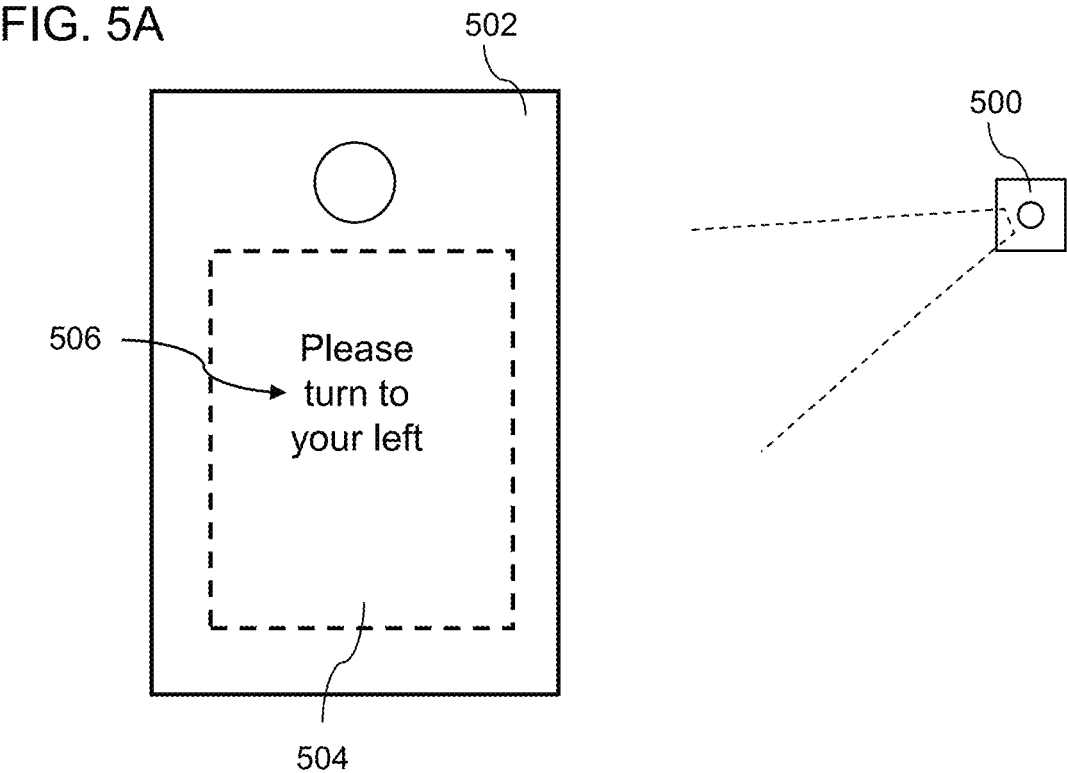
FIGS. 5A-5B are schematics showing an example of automatic spoofing system reconfiguration.
Figure 5B:
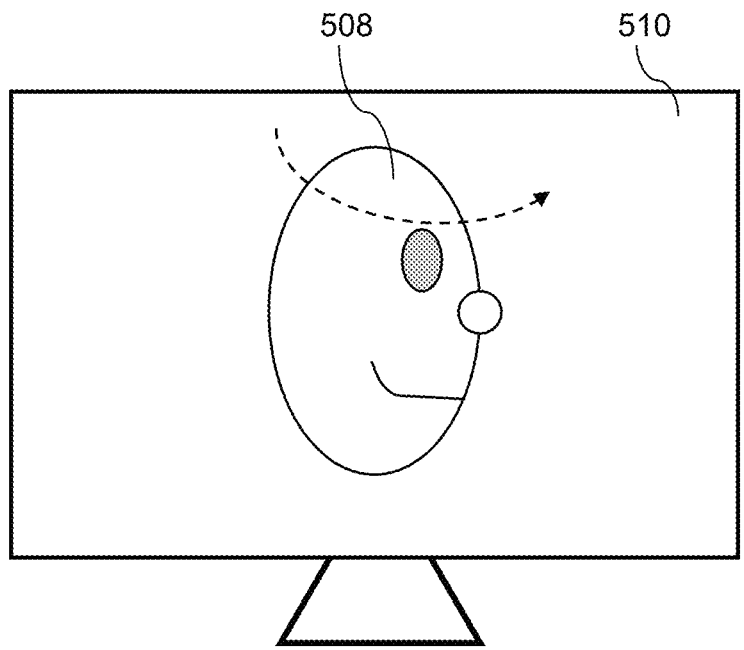

FIGS. 5A-5B show another example process using a second capture device 500. As described in reference to FIGS. 4A-4B, the second capture device 500 is arranged and configured to capture images of the spoof capture device 502. The spoof capture device 502 includes a display 504. In this example, the display 504 presents instructions 506 corresponding to a biometric authentication process being performed by the spoof capture device 500.

The instructions 506 are captured by the second capture device 500, identified, and interpreted (e.g., by a control system or by another system), and spoof parameters are correspondingly adjusted. In this example, the instructions 506 instruct a user to "please turn your left." In response, as shown in FIG. 5B, a spoof representation 508 presented on a display monitor 510 is reconfigured to turn to the left, e.g., by rotating a simulated model of a human, by switching to an alternative image in which the spoof representation 508 faces left, or by playing a pre-captured video in which a human turns to their left.

Other types of instructions are also identifiable and interpretable, in various implementations, including posing instructions (e.g., "close your eyes"), positional instructions (e.g., "hold your phone further away," "position your face in the middle of the display"), lighting-related instructions (e.g., "your image is too dark; please move to a brighter location"), and other instructions, and configurations of the automatic spoofing system can correspondingly be adjusted to follow the instructions.

In some implementations, spoofing success or failure is determined based on an image captured by a second capture device, e.g., based on a success or failure message presented on the display of the spoof capture device.

Figure 6A:
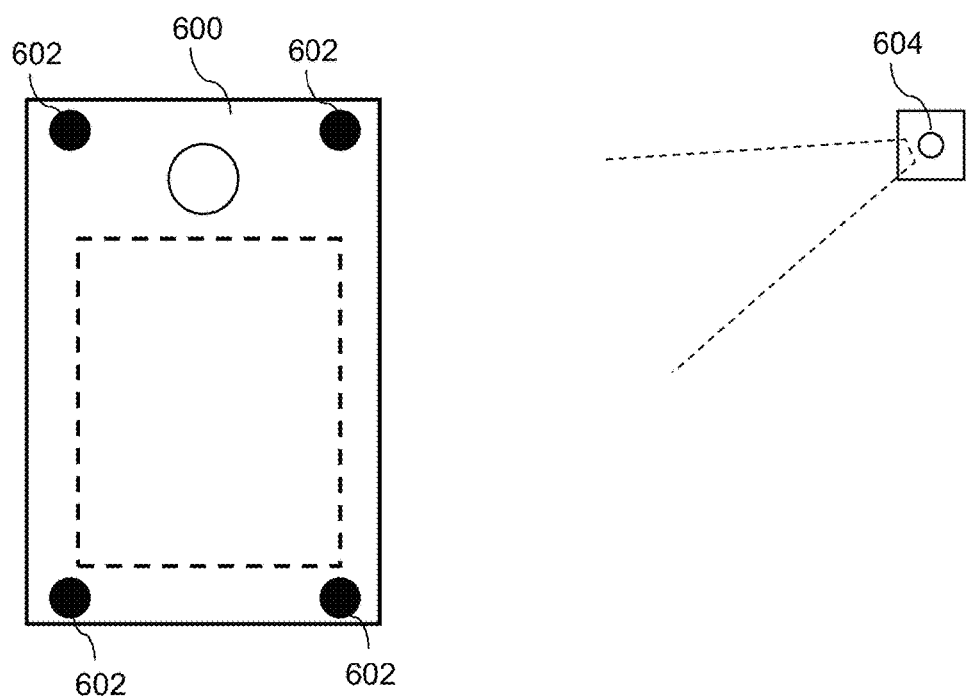
FIGS. 6A-6B are schematics showing examples of automatic spoofing systems including marking features.

In some implementations, to aid in identification in captured images, components may be indicated by one or more markers. As shown in the example of FIG. 6A, a spoof capture device 600 includes markers 602 at four corners of the spoof capture device 600. When a second capture device 604 captures images of the spoof capture device 600, the images can be analyzed to specifically identify the markers 602 and, based on the markers, determine a position of the spoof capture device 600. Relative positions of the spoof capture device 600 and spoof representation may be correspondingly adjusted based on the position of the spoof capture device 600. Identification of the spoof capture device 600 based on the markers 602 may also aid in more easily (e.g., computationally more quickly, more efficiently, and/or more reliably) identifying instructions or other information presented by the spoof capture device 600.

Figure 6B:
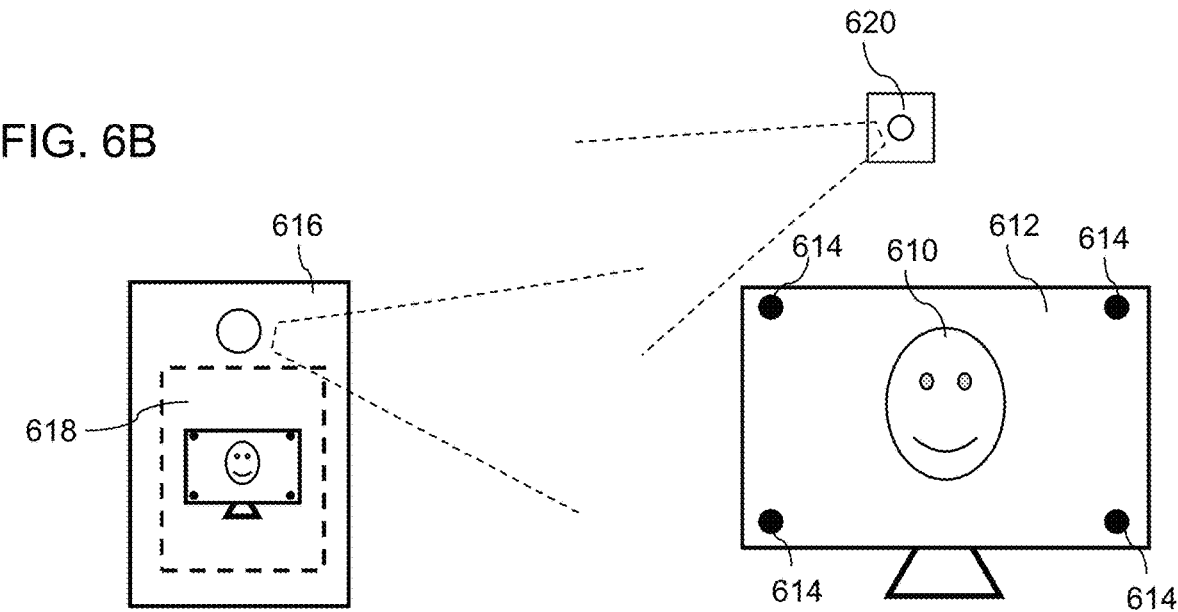

Markers may instead, or additionally, be used to mark a spoof representation. As shown in the example of FIG. 6B, a spoof representation 610 is presented on a display monitor 612, and markers 614 are positioned at four corners of the display monitor 612. A spoof capture device 616 captures, and correspondingly displays, an image 618 of the spoof representation 610. A second image of the image 618 is in turn captured by a second capture device 620. The presence of the markers 614 in the image 618 makes it easier (e.g., computationally faster, efficient, and/or more reliable) to identify the spoof representation 610 and/or display monitor 612 in the image 618 as captured in the second image. A relative position and/or configuration of the spoof representation 610 may be correspondingly adjusted based on the identification of the spoof representation in the image 618 using the markers 614.

In some implementations, the markers (e.g., markers 602, 614) are patterned and/or reflective stickers or other physical labels. In some implementations, the markers are presented on a display, e.g., on a display of a spoof capture device or on a display that also presents a spoof representation. An image analysis process may be specially configured to detect the markers and, based on detection of the markers, identify the spoof representation or spoof capture device.

In some implementations, operations are carried out using the spoof capture device. For example, the spoof capture device may be used to capture an image of the spoof representation, and therefore the "capture image" operation on the spoof capture device must be somehow caused or triggered. As another example, in some implementations, a biometric authentication process runs on the spoof capture device, and the biometric authentication process includes an interactive element. For example, the biometric authentication process may run as part of an application on the spoof capture device, and a (physical or software) button labeled "press this button to begin facial image login" must be selected in order to begin or progress the biometric authentication process.

These and other operations using the spoof capture device may be carried out in any one or more of a variety of different ways, in combination with any of the example implementations described in this disclosure. In some implementations, operations of the spoof capture device are triggered "internally," by software running on the spoof capture device. For example, a control process may run simultaneously to a biometric authentication process, the control processing performing necessary user interactions, triggering image capture, etc., as needed based on the specifics of the biometric authentication process and spoof capture device. This software-based approach may be mechanically simpler to implement than other approaches. However, in many cases, software running on a spoof capture device will be restricted, e.g., by security limitations of an operating system of the spoof capture device, such that a purely software-based approach is infeasible. In some implementations, these restrictions can be bypassed (e.g., by "rooting" the spoof capture device), but the bypass may not be reliable or desirable to rely on in general. Also, in some implementations, physical device interaction is necessary as part of the biometric authentication process.

Figure 7:
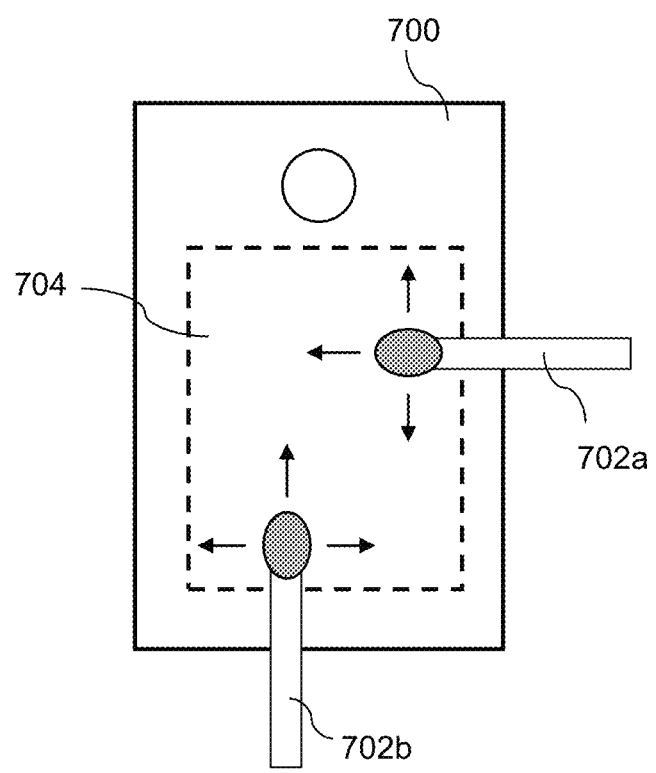
FIG. 7 is a front view of a portion of an example spoof capture device that can be used to implement the technology described herein.

At least for these reasons, in some implementations a robotic manipulator is used to interact with a spoof capture device. As shown in the example of FIG. 7, two independently-controllable styluses 702a, 702b are movable in proximity to a spoof capture device 700. The styluses 702a, 702b each coupled to a respective movement unit (e.g., using a servo motor) that can move the styluses 702a, 702b both laterally/longitudinally with respect to the spoof capture device 700. The styluses 702a, 702b can also be actuated to contact a touchscreen display 704 of the spoof capture device 700. Movement of the styluses 702a, 702b may be controlled by a control system as described throughout this disclosure.

In operation, the styluses 702a, 702b can be used to simulate user interaction with the spoof capture device 700, e.g., pressing icons/buttons, swiping, entering codes, etc., depending on the interaction options presented by the biometric authentication process running on the spoof capture device 700. A state of the spoof capture device 700 is determined based on direct data output from the spoof capture device 700 (as described in more detail in reference to FIG. 9), based on an image of the spoof capture device 700 captured by a second capture device, or by both methods.

In one example, the second capture device captures an image of the spoof capture device 700, including the display 704. The image is passed to the control system, which analyzes the image and recognizes that the biometric authentication process running on the spoof capture device 700 is requesting a button to be pressed. The control system identifies a position of the button on the display 704, determines a position of stylus 702a that corresponds to the button, moves the stylus 702a to the determined position, and causes actuation of the stylus 702a to press the button. The biometric authentication process then progresses to a new state that is, in turn, identified based on a new image captured by the second capture device.

Figure 8A:
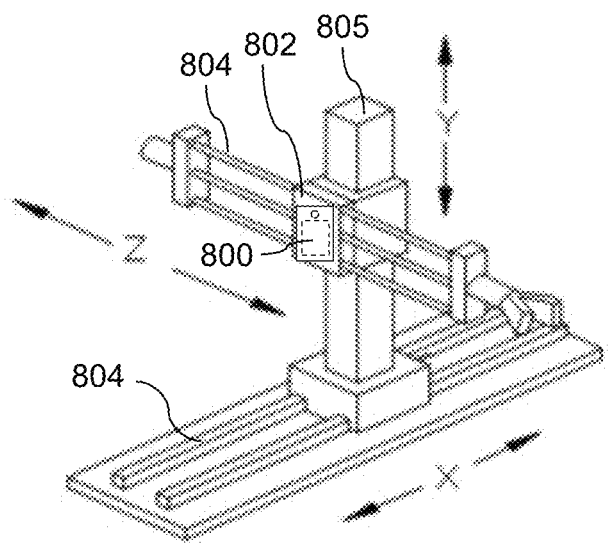
FIG. 8A is a perspective view of an example spoof capture device.
Figure 8B:
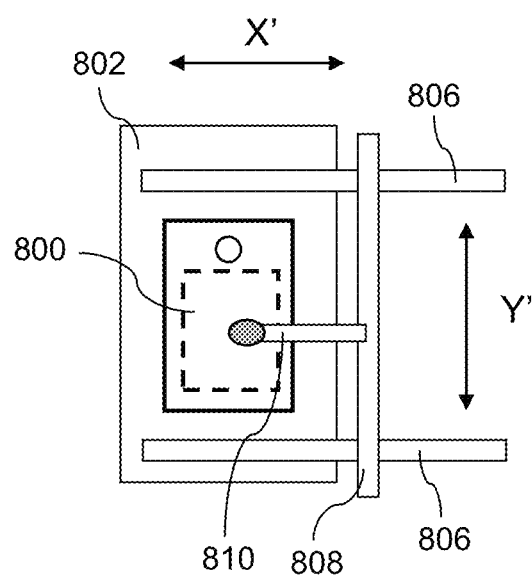
FIG. 8B is a front view of a portion of an example spoof capture device.

FIGS. 8A-8B show example implementations of a movement mechanism and robotic manipulator. A spoof capture device 800 is mounted vertically on a platform 802. The platform 802 is movable in X, Y, and Z directions by tracks 804 and on bar 805, such that the spoof capture device 800 may be moved to adjust a positional spoof parameter in three dimensions, to center a spoof representation in a field of view of the spoof capture device 800, etc.

As shown in FIG. 8B, the platform 802 is attached to two rails 806 on which a bar 808 is movable. A stylus 810 is movable by moving the bar 808 on the rails 806, e.g., in directions X' and Y' as shown. The stylus 810 can also be actuated to interact with the spoof capture device 800.

The example mechanisms shown in FIGS. 7-8B are merely exemplary. In practice, various movement and manipulation mechanisms may be used, based on desired movement range/options, the size and configuration of the spoof capture device, etc. One, two, or more styluses or other physical interactive elements may be used in conjunction with one another.

Figure 9:
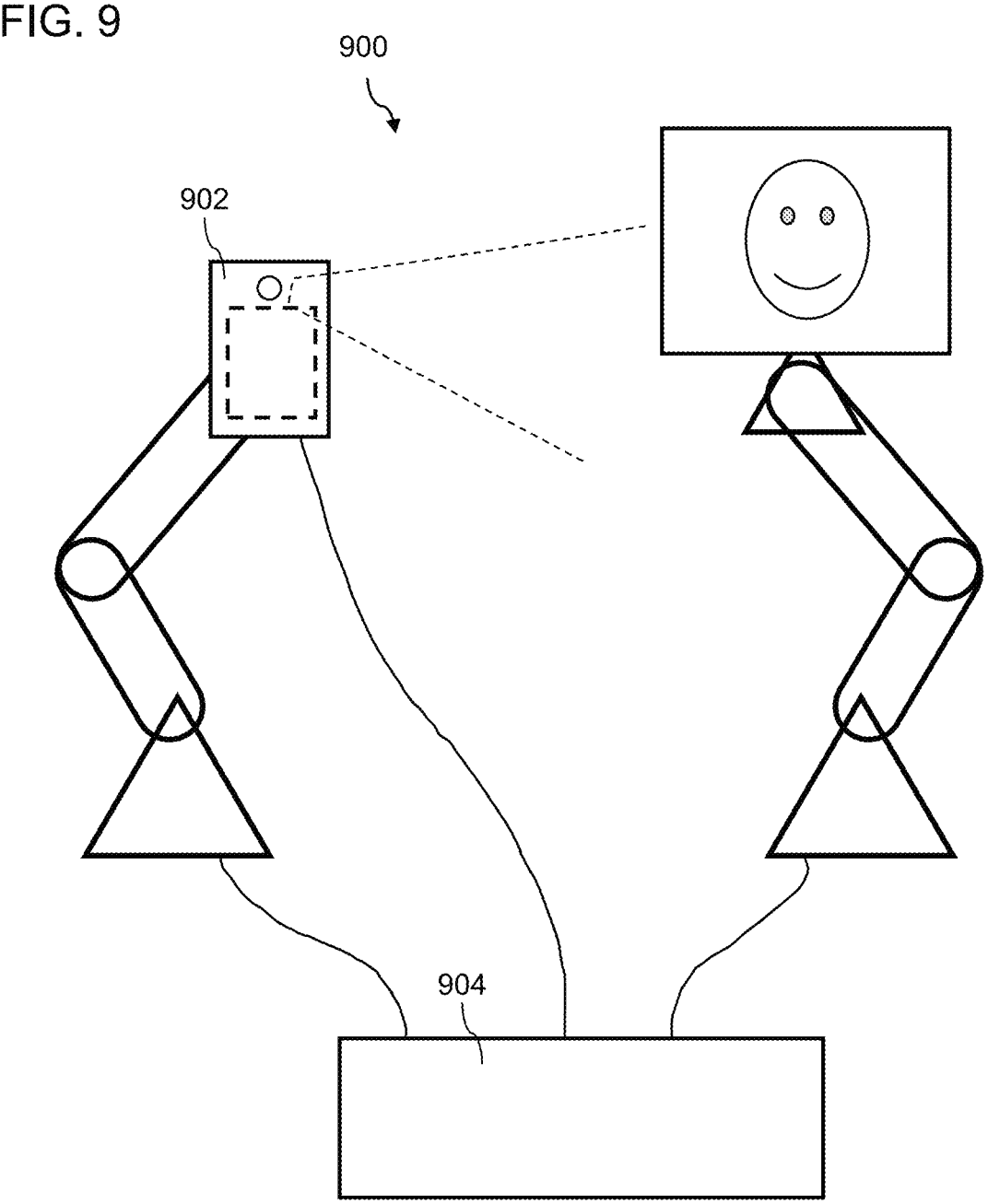
FIG. 9 is a schematic showing an example automatic spoofing system.

FIG. 9 shows an example automatic spoofing system 900 that does not include a second capture device arranged to capture images of the spoof capture device 902. Instead, in this example, a state of the spoof capture device 902 is determined directly from the spoof capture device 902. For example, the spoof capture device 902 may transmit screen captures to the control system 904, which analyzes the screen captures as described throughout this disclosure for images captured by a second capture device. Any operation or class of operations described herein based on images from a second capture device may instead, or additionally, be based on data read from the spoof capture device 902.

In some implementations, images captured by a second capture device are used in conjunction with data read from a spoof capture device. For example, a position of the spoof capture device may be determined based on an image captured by a second capture device, while a higher-resolution direct screen capture of the spoof capture device may be analyzed using optical character recognition to determine instructions presented by the spoof capture device.

Moreover, as previously noted, in some implementations the spoof capture device is primarily an image capture device that transmits captured images to another system for biometric authentication analysis. In such cases, the spoof capture device may not include a display to be imaged. However, images of the spoof capture device may still be used in some of these implementations, e.g., to determine a relative position of the spoof capture device and the spoof representation.

Figure 10A:
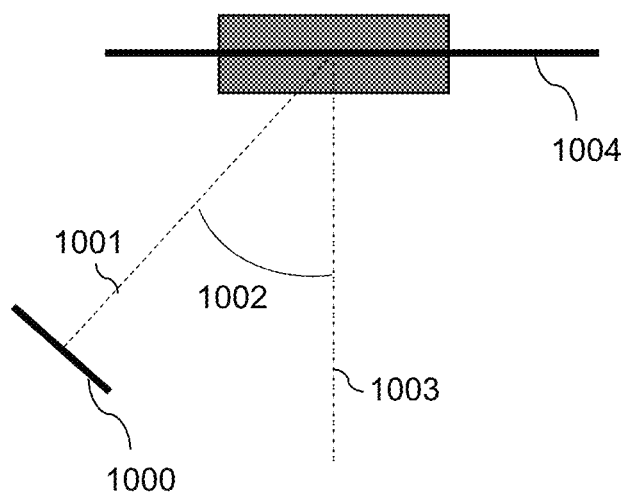

In some cases, a spoof capture device captures an image of a displayed spoof representation at an angle. For example, as shown in FIG. 10A, a spoof capture device 1000 may be arranged at a non-zero capture angle 1002 with respect to a display monitor 1004 displaying a spoof representation. The capture angle 1002 is the angle between a normal 1003 to a display surface of the display monitor 1004 and a normal 1001 to a capture surface of the spoof capture device 1000. For example, the normal 1001 may be normal to a front-facing transparent surface of the spoof capture device 1000 through which light enters the spoof capture device 1000 to be captured. The normal 1003 may be normal to a screen of the display monitor 1004.

The non-zero capture angle 1002 may arise due to inexact and/or variable positioning of the spoof capture device 1000 and/or display monitor 1004. Alternatively, or in addition, the non-zero capture angle 1002 may be intentional in order to avoid screen reflections that can be captured by the spoof capture device 1000 when the spoof capture device 1000 views the display monitor 1004 head-on (e.g., at a capture angle at or near 0 degrees, such as less than 5 degrees, less than 10 degrees, less than 20 degrees, or another angle). Some spoof detection systems are designed to detect these reflections and flag them as indicative of spoofing. As such, larger capture angles can be beneficial for preventing spoof representations from being identified by spoof detection systems as spoof representations. The non-zero capture angle 1002, in various implementations, may be greater than 10 degrees, greater than 20 degrees, greater than 30 degrees, greater than 40 degrees, or another angle.

However, in the absence of correction, spoof capture devices having a non-zero capture angle with respect to corresponding display devices may capture a spoof representation that is distorted due to this angular orientation, with features compressed and/or warped compared to images captured at a head-on capture angle (i.e., when the normal 1003 to the display surface of the display 1004 coincides, at least approximately, with the normal 1001 to the capture surface of the spoof capture device 1000). Such distortions may be identified by either or both of anti-spoofing processes (e.g., algorithms specifically looking for distortions caused by non-zero capture angles) or biometric authentication processes, because a distorted spoof representation is less likely to provide a match compared to a reference biometric image taken at a head-on capture angle.

Therefore, in some implementations according to this disclosure, a displayed spoof representation is transformed to account for non-zero capture angles. For example, the spoof representation may be transformed to have an "apparent capture angle" that is different from the actual capture angle. The actual capture angle is the physical angle, in real space, between the normal 1003 to a display surface of the display 1004 and the normal 1001 to the capture surface of the spoof capture device 1000, as described in reference to FIG. 10A. The apparent capture angle is a capture angle at which the spoof capture device appears to be capturing the spoof representation, from the perspective of the spoof capture device and with respect to an un-transformed spoof representation.

FIGS. 10B-1D show examples of how capture angle affects captured images. A shown in FIG. 1B, a spoof capture device 1000 is oriented at a capture angle of approximately zero degrees (head-on) with respect to a display monitor 1004. The display monitor 1004 displays an original image 1020 that includes a facial image 1022 (which may be a spoof representation, in spoof-testing applications) and a rectangle 1024. A captured image 1026, captured by the spoof capture device 1000, is the original image 1020: because the capture angle is zero degrees, the original image 1020 is undistorted when captured by the spoof capture device 1000.

In the example of FIG. 10C, a spoof capture device 1000 is oriented at a non-zero capture angle 1002 with respect to the display monitor 1004, which displays the original image 1020. A captured image 1028 is distorted as a result of the non-zero capture angle 1002. In this example, the apparent capture angle is the non-zero actual capture angle 1002, because no transformations have been applied to the original image 1020.

In the example of FIG. 10D, a spoof capture device 1000 is oriented at the non-zero capture angle 1002 with respect to the display monitor 1004, as described in reference to FIG. 10D. However, in this example, the display monitor 1004 displays a transformed image 1030, e.g., a transformed spoof representation. The transformed image 1030 is transformed, compared to the original image 1020, to account for the non-zero capture angle 1002. Because of the transformation, the image captured by the spoof capture device 1000 includes the original image 1020. From the perspective of the image capture device 1000, it appears as though the original image 1020 was displayed by the display monitor 1004 and captured head-on as in FIG. 10B, such that the apparent capture angle is zero degrees.

Because of the transformation, in some implementations, the apparent capture angle is different from the actual capture angle. For example, the transformation may be such that the apparent capture angle is less than the actual capture angle. The transformation may be such that the apparent capture angle is head-on.

Figure 10E:
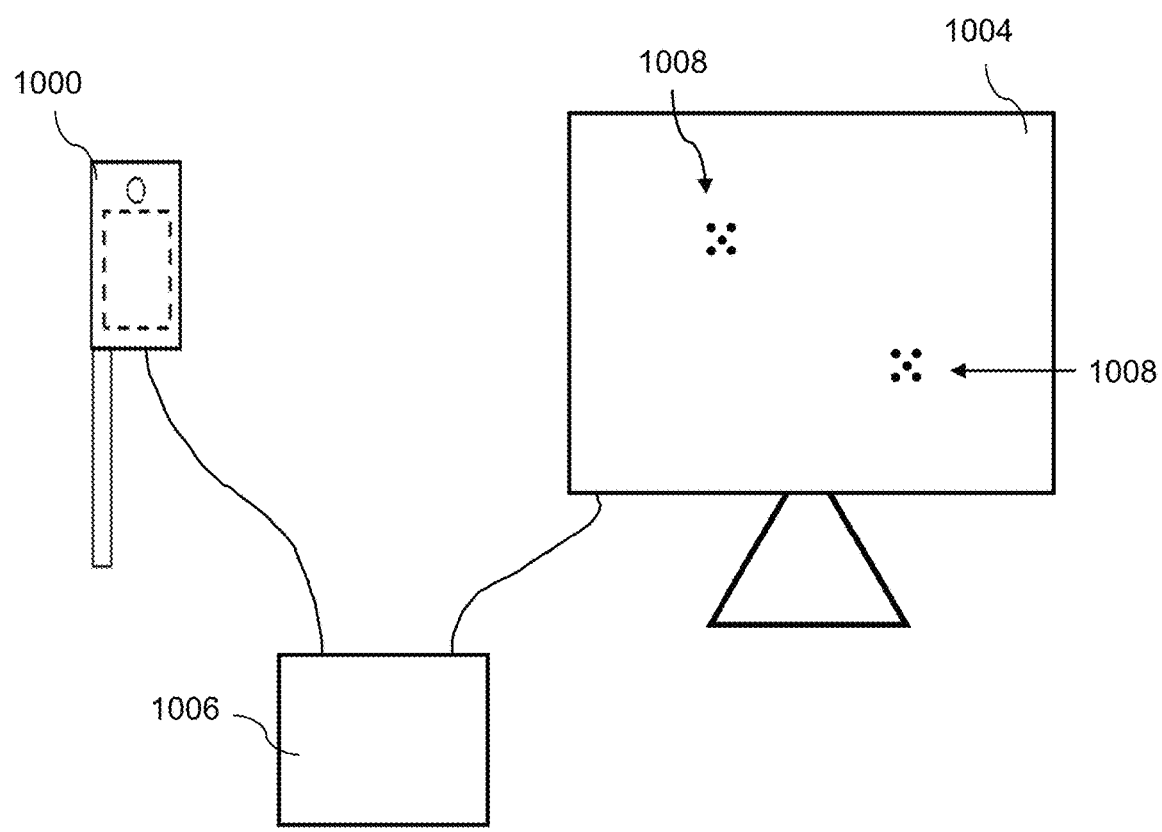
FIG. 10E is a front view of an example automatic spoofing system.

To determine the transformation, as shown in FIG. 10E, a control system 1006 is coupled to the spoof capture device 1000 and the display monitor 1004. The control system 1006, spoof capture device 1000, and display monitor 1004 can have any or all of the features described for corresponding elements throughout this disclosure, e.g., for control systems, spoof captures devices, and display monitors described in reference to FIGS. 1-9.

The control system 1006 causes the display monitor 1004 to display a calibration pattern including one or more pattern elements 1008. In this example, each pattern element 1008 is a pattern of five dots that can be easily differentiated from other elements in captured images; however, other types of pattern elements can be used instead or additionally.

The control system 1006 receives an image captured by the spoof capture device 1000 of the display monitor 1004 and performs image analysis to identify the pattern elements 1008 in the image. The control system 1006 determines a mapping between locations of the pattern elements 1008 in the image and locations of the pattern elements 1008 on the display monitor 1004. This mapping can be used to determine a transformation that will account for the non-zero capture angle between the spoof capture device 1000 and the display monitor 1004. Such a transformation can be used to transform an image such that the image appears to have been captured from an apparent capture angle that is different from the non-zero capture angle from which the image is actually captured.

Various methods can be used to determine the transformation. In some implementations, the control system 1006 controls the spoof capture device 1000 and the display monitor 1004 in an iterative sequence in which the display monitor 1004 displays a calibration pattern, the spoof capture device 1000 captures an image of the calibration pattern, and the control system 1006 analyzes the captured image. The iterative process is then repeated for a new calibration pattern.

In some implementations, a determination may be made that a captured image does not show the calibration pattern. Based on this, it may be determined that a current field of view of the spoof capture device 1000 does not include monitor locations at which portions of the calibration pattern (e.g., pattern elements of the calibration pattern) are displayed. In response, the pattern elements can be displayed at different locations on the display monitor 1004, and/or the spoof capture device 1000 can be moved to have a different field of view. The spoof capture device 1000 can be moved, for example, manually or using a movement mechanism as described in reference to FIG. 1 and throughout this disclosure.

In some implementations, after an initial identification of a first pattern element in a captured image has been performed, one or more additional calibration patterns are displayed in a sequence. For example, in some implementations, the additional calibration patterns include pattern elements that are progressively further away from a position of the first pattern element on the display monitor 1004. Each pattern element is searched for by the control system 1006 in a captured image corresponding to the calibration pattern in which the pattern element is displayed, e.g., to determine whether the pattern element is within the field of view of the spoof capture device 1000 and to determine mappings between locations in images captured by the spoof capture device 1000 and corresponding display locations on the display monitor 1004. Through this sequential process, the control system 1006 identifies the boundaries of the field of view of the spoof capture device 1000.

In some implementations, based on these identified boundaries, or based on other identified locations mappings, the control system 1006 identifies display locations on the display monitor 1004 that correspond to corners (e.g., four corners) of the field of view of the spoof capture device 1000. The transformation may then map relative corner locations of the field of view to mapped display locations of the corners.

Mathematically, the transformation may be represented by matrix multiplication using a transformation matrix. Multiplication by the transformation matrix maps locations of elements of the spoof representation (e.g., pixels or vertices) to new locations, to create a transformed spoof representation having a desired apparent capture angle for the spoof capture device, e.g., a head-on capture angle.

In some implementations, the transformation matrix is configured to transform undistorted corners of a field of view to identified display locations of the corners. For example, the transformation matrix may map corners of a rectangle to corners of a compressed and/or distorted rectangle, such that the compressed and/or distorted rectangle, when viewed from the capture angle of the spoof capture device, appears to be uncompressed and undistorted.

Other effects of the transformation matrix or methods for determining the transformation matrix are also within the scope of this disclosure. For example, the transformation may be represented by a 4×4 transformation matrix that operates on four row/column vertex vectors to rotate, scale, and translate the vertex vectors. Specifically, in some implementations, the transformation matrix has the following form:

$$\begin{pmatrix} A_{11} & A_{12} & A_{13} & t_x \\ A_{21} & A_{22} & A_{23} & t_y \\ 0 & 0 & 1 & 0 \\ p_x & p_y & 0 & 1 \end{pmatrix}$$

In this example transformation matrix, the $A_{ij}$ elements are associated with rotation and scaling of vertices, the $t_i$ elements are associated with translation of vertex points after rotation and scaling, and the $p_i$ elements are associated with projection.

After multiplication by the transformation matrix, resulting vertex vector elements are rescaled such that a fourth element of the vertex vector (which had a magnitude of 1 before the multiplication) has a magnitude of 1. The multiplied and rescaled vertex vector indicates a coordinate in a two-dimensional space at which a transformed element of the spoof representation should be displayed on the display monitor 1004.

In some implementations, the determined transformation matrix is passed to a graphics processing unit of the control system 1006 (e.g., to a vertex shader of the graphics processing unit) which performs the matrix multiplication.

When a spoof capture device captures images of the transformed spoof representation (e.g., the transformed spoof representation 1030), the transformed spoof representation will appear to be untransformed, e.g., will look like the untransformed, original spoof representation (e.g., the original spoof representation 1020). The transformation is effective because the location mappings upon which the transformation is based were determined based on calibration images captured by the spoof capture device at the same non-zero capture angle from which the spoof testing image is captured.

Spoof representation transformation can be performed in conjunction with any implementation according to this disclosure in which spoof representations are displayed on a display monitor. For example, when displayed spoof representations move (e.g., perform requested actions for authentication), the moving spoof representations can be transformed to obtain transformed video or animated spoof representations.

In some implementations, an automatic spoofing system includes one or more mechanisms configured to simulate non-visual aspects of a biometric authentication process. For example, in some implementations a spoof capture device is mounted in or on a platform or robotic gripper that includes a controllable haptic feedback mechanism or other vibration module configured to mimic natural hand trembling and/or micro-shakes (e.g. due to cardiac vibrations). These movements may be measured by the spoof capture device (e.g., by an accelerometer of the spoof capture device or by analyzing multiple images captured by the spoof capture device and determining acceleration of the spoof capture device based on movement of features in the multiple images) and used to identify spoofing attempts as part of the biometric authentication process. An operational state of the robotic gripper (e.g., vibrational frequency, amplitude, and/or other pattern) may be adjusted as a spoofing parameter during automated spoof testing. For example, platform 802 shown in FIGS. 8A-8B may incorporate a vibration module.

In some implementations, an automatic spoofing system incorporates an audio module. The audio module may emit audio during automated spoof testing. For example, an image of a display of a spoof capture device, the image captured by a second capture device, may include a presented instruction to "say your code phrase." Accordingly, a control system may recognize that audio is necessary to progress the biometric authentication process, and an appropriate audio output may be provided by the audio module. A configuration of the output audio (e.g., audio quality, audio content, voiceprint parameters, etc.) may be adjusted as spoofing parameters during automated spoof testing.

Figure 11:
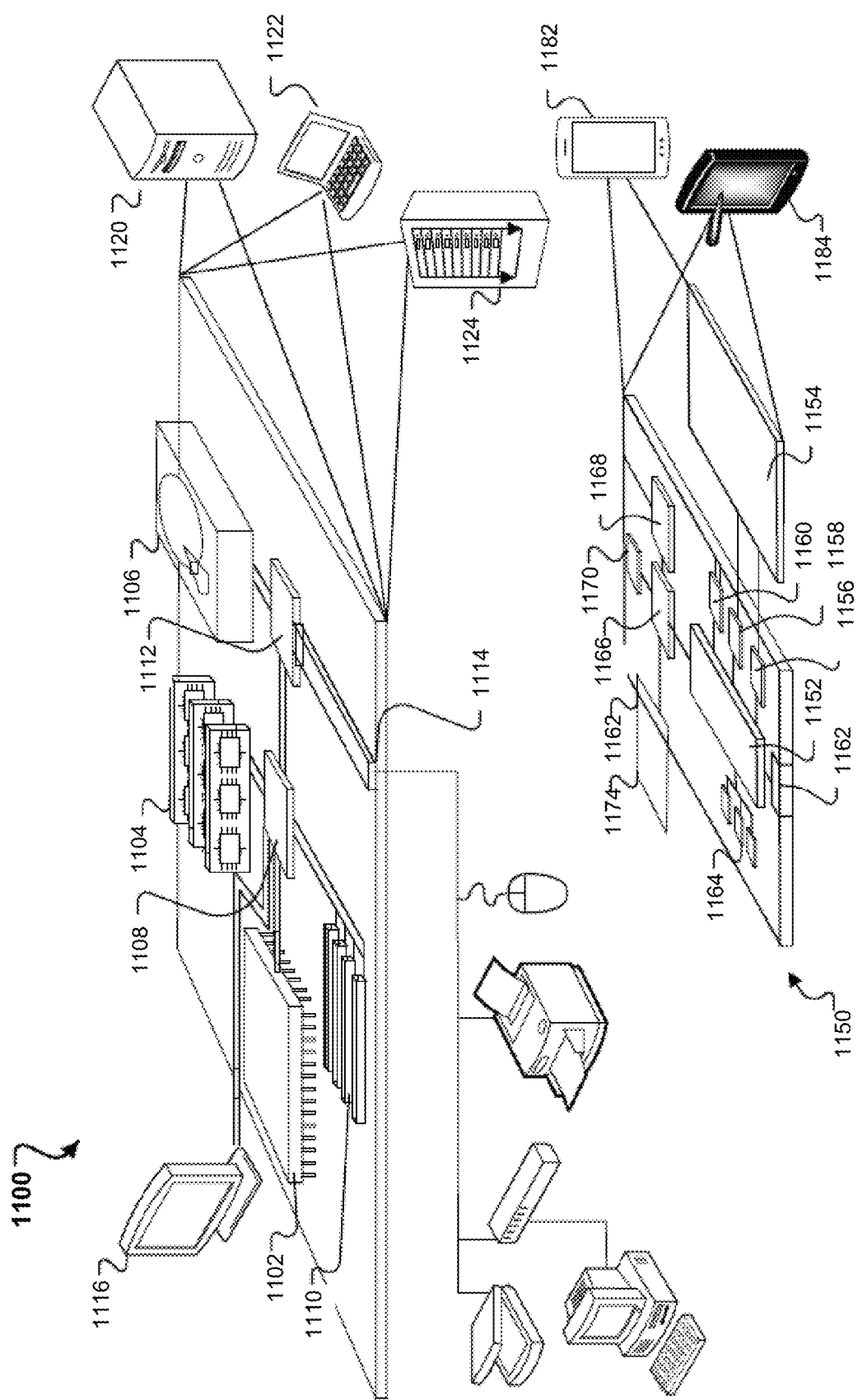
FIG. 11 is a block diagram representing examples of computing devices in accordance with one or more implementations of the present disclosure.

The use of an automatic spoofing system, as described in various examples throughout this disclosure, can present various advantages compared to other approaches, e.g., manual testing. For example, some implementations of the described systems can perform more spoofing tests, faster spoofing tests, or both, compared to other approaches. In some implementations, the use of a movable and/or displayed spoof representation can allow for more precise and/or repeatable testing of biometric authentication processes. In some implementations, the combination of elements incorporated into the automatic spoofing system can allow for more complete evaluations of biometric authentication processes, compared to systems FIG. 11 shows an example of a computing device 1100 and a mobile device 1150, which may be used with the techniques described here. The computing device 1100, the mobile device 1150, or a combination of these devices may represent a control system, a spoof capture device, a remote system performing image analysis processes, biometric authentication processes, or other processes, or another element described in this disclosure. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 1100 includes a processor 1102, memory 1104, a storage device 1106, a high-speed controller 1108 connecting to memory 1104 and high-speed expansion ports 1110, and a low-speed controller 1112 connecting to low-speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high-speed controller 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, memory on processor 1102, or a propagated signal.

The high-speed controller 1108 manages bandwidth-intensive operations for the computing device 1100, while the low-speed controller 1112 manages lower bandwidth-intensive operations. Such allocation of functions is an example only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed bus 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, memory on processor 1152, or a propagated signal that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, and so forth) and may also include sound generated by applications operating on device 1150.

The computing device 1150 may be implemented in a number of different forms, as shown in the figure. For example, it may be implemented as a cellular telephone. It may also be implemented as part of a smartphone 1182, personal digital assistant, tablet computer 1184, or other similar mobile device. The computing device 1150 may be implemented as part of a kiosk device.

Figure 12:
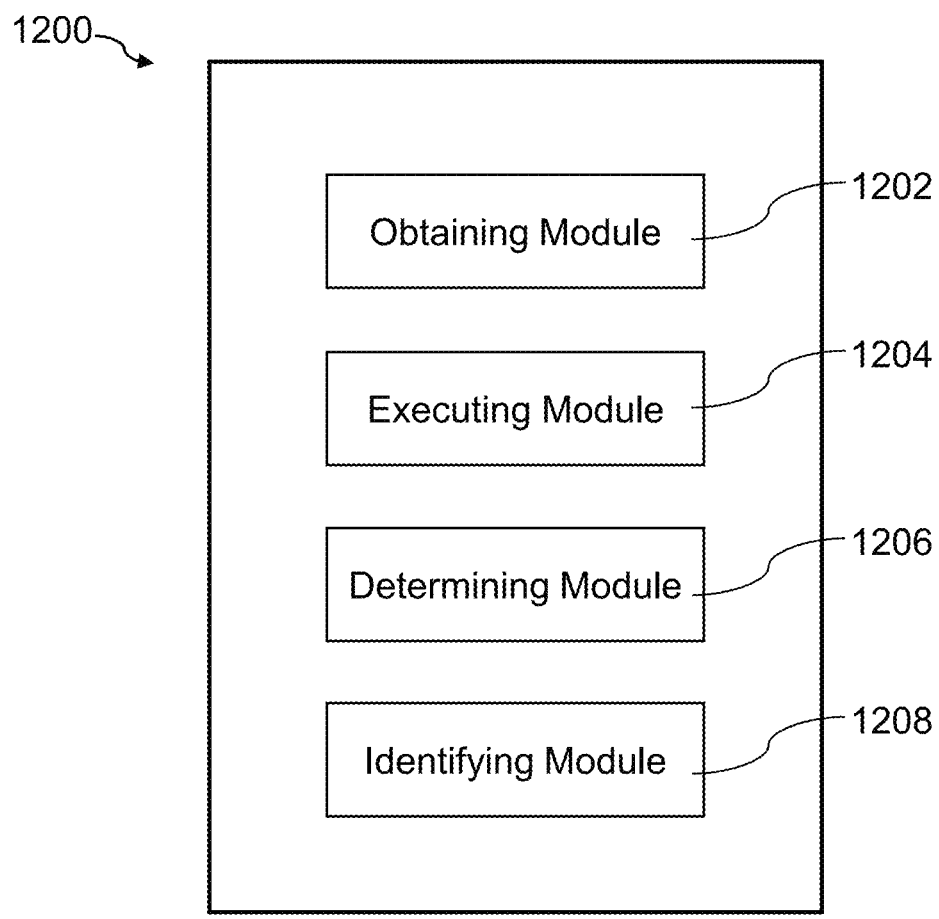
FIGS. 12-14 are flow diagrams showing examples of modules of apparatuses in according with one or more implementations of this disclosure.

FIG. 12 depicts examples of modules of an apparatus 1200 in accordance with one or more implementations of the present disclosure. The apparatus 1200 can be an example of an implementation of a system configured to perform spoof testing. The apparatus 1200 can correspond to one or more of the implementations described above, and the apparatus 1200 includes the following. An obtaining module 1202 obtains multiple images of a spoof representation of a human user. In some implementations, the multiple images are captured automatically by an image capture device, and each of the multiple images is captured at a different relative position between the image capture device and the spoof representation. An executing module 1204 executes a biometric authentication process separately on each of at least a subset of the multiple images. A determining module 1206 determines that the biometric authentication process authenticates the human user based on at least a first image from the subset. An identifying module 1208 identifies a relative position between the image capture device and the spoof representation corresponding to the first image as a failure condition associated with the biometric authentication process.

In some implementations, the spoof representation of the human user includes an image displayed on a monitor, a printed image, or a three-dimensional representation.

In some implementations, the obtaining module 1202 obtains one or more parameters associated with capture of the first image, the one or more parameters representing at least one of ambient lighting or a configuration of the spoof representation; and the identifying module 1208 identifies the one or more parameters as a portion of the failure condition associated with the biometric authentication process.

In some implementations, the apparatus 1200 includes a moving module that causes movement of at least one of the image capture device or the spoof representation to set the different relative positions corresponding to the multiple images.

In some implementations, the obtaining module 1202 obtains an image of the image capture device, where the movement of at least one of the image capture device or the spoof representation is based on the image of the image capture device.

In some implementations, the identifying module 1208 identifies one or more marking features on the image capture device in the image of the image capture device; and the determining module 1206 determines a position of the image capture device based on the one or more marking features, where the movement of at least one of the image capture device or the spoof representation is based on the identified position of the image capture device.

In some implementations, the image capture device includes a display, and the identifying module 1208 identifies a field of view of the image capture device presented on the display in the image of the image capture device, where the movement of at least one of the image capture device or the spoof representation is based on the identified field of view presented on the display.

In some implementations, the image capture device includes a display, and the identifying module 1208 identifies authentication instructions presented on the display in the image of the image capture device. The apparatus 1200 includes an adjusting module that adjusts a configuration of the spoof representation based on the identified authentication instructions presented on the display.

In some implementations, the image capture device includes a mobile device.

In some implementations, the apparatus 1200 includes a manipulating module that causes a robotic manipulator to interact with the image capture device. The interaction causes the image capture device to capture the first image.

In some implementations, the apparatus 1200 includes a vibrating module that causes a vibration of the image capture device.

Figure 13:
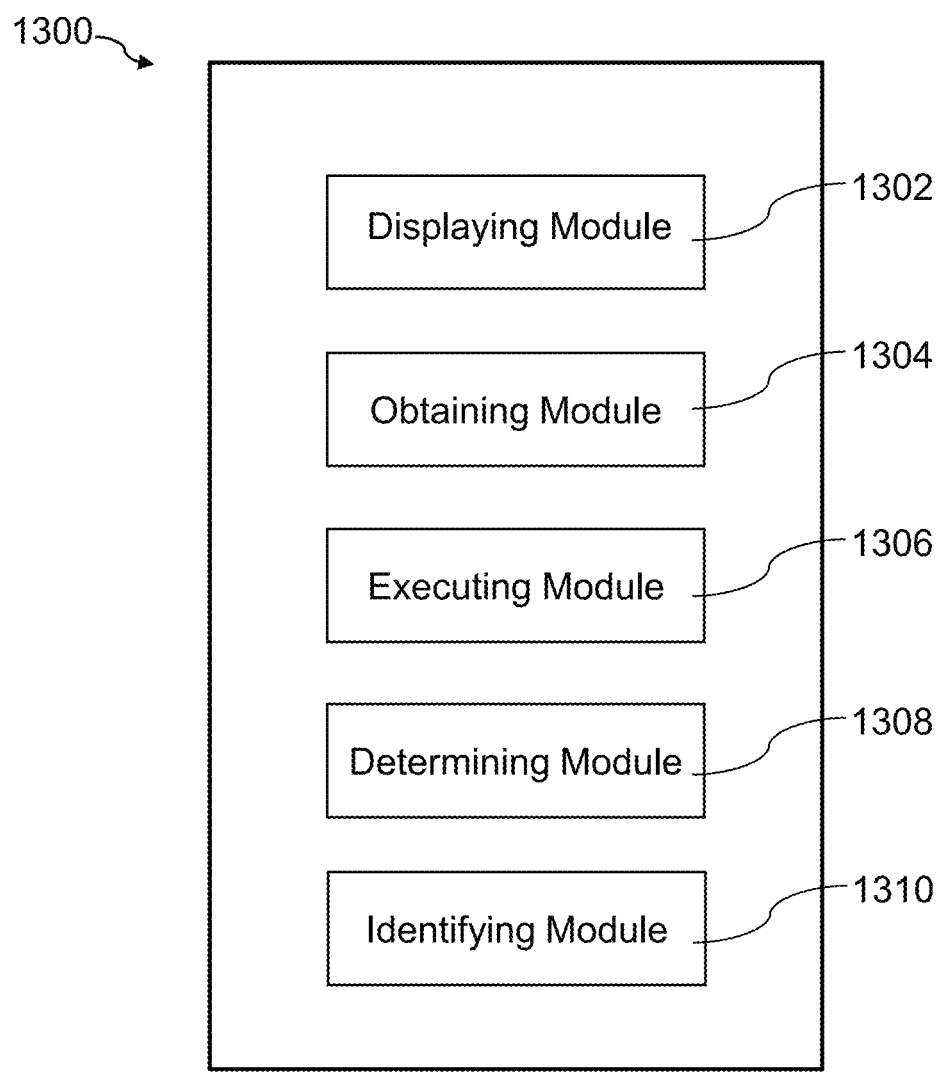

FIG. 13 depicts examples of modules of an apparatus 1300 in accordance with one or more implementations of the present disclosure. The apparatus 1300 can be an example of an implementation of a system configured to perform spoof testing. The apparatus 1300 can correspond to one or more of the implementations described above, and the apparatus 1300 includes the following. A displaying module 1302 causes a first display device to display a spoof representation of a human user. An obtaining module 1304 obtains multiple images of the spoof representation. In some implementations, the multiple images are captured automatically by an image capture device, and each of the multiple images captures a different corresponding configuration of the spoof representation displayed on the first display device. An executing module 1306 executes a biometric authentication process separately on each of at least a subset of the multiple images. A determining module 1308 determines that the biometric authentication process authenticates the human user based on at least a first image from the subset. An identifying module 1310 identifies a configuration of the spoof representation corresponding to the first image as a failure condition associated with the biometric authentication process.

In some implementations, the different corresponding configurations include at least one of: a zoom level of the spoof representation, a position of the spoof representation on the first display device, an action performed by the spoof representation, or a lighting environment of the spoof representation.

In some implementations, the different corresponding configurations include at least one of: a brightness of the display, a contrast of the display, or a color temperature of the display.

In some implementations, the obtaining module 1304 obtains an image of the image capture device, where the different corresponding configurations of the spoof representation are based on the image of the image capture device. In some implementations, the image capture device includes a second display device, the first display device includes one or more marking features, the identifying module 1310 identifies a field of view of the image capture device displayed on the second display device in the image of the image capture device, and the apparatus 1300 includes a setting module that sets one of the different corresponding configurations based on a position of the one or more marking features in the field of view.

In some implementations, the image capture device includes a second display device, the identifying module 1310 identifies authentication instructions displayed on the second display device in the image of the image capture device, and the setting module sets one of the different corresponding configurations based on the identified authentication instructions.

In some implementations, the apparatus 1300 includes a manipulating module that causes a robotic manipulator to interact with the image capture device, where the interaction causes the image capture device to capture the first image.

Figure 14:
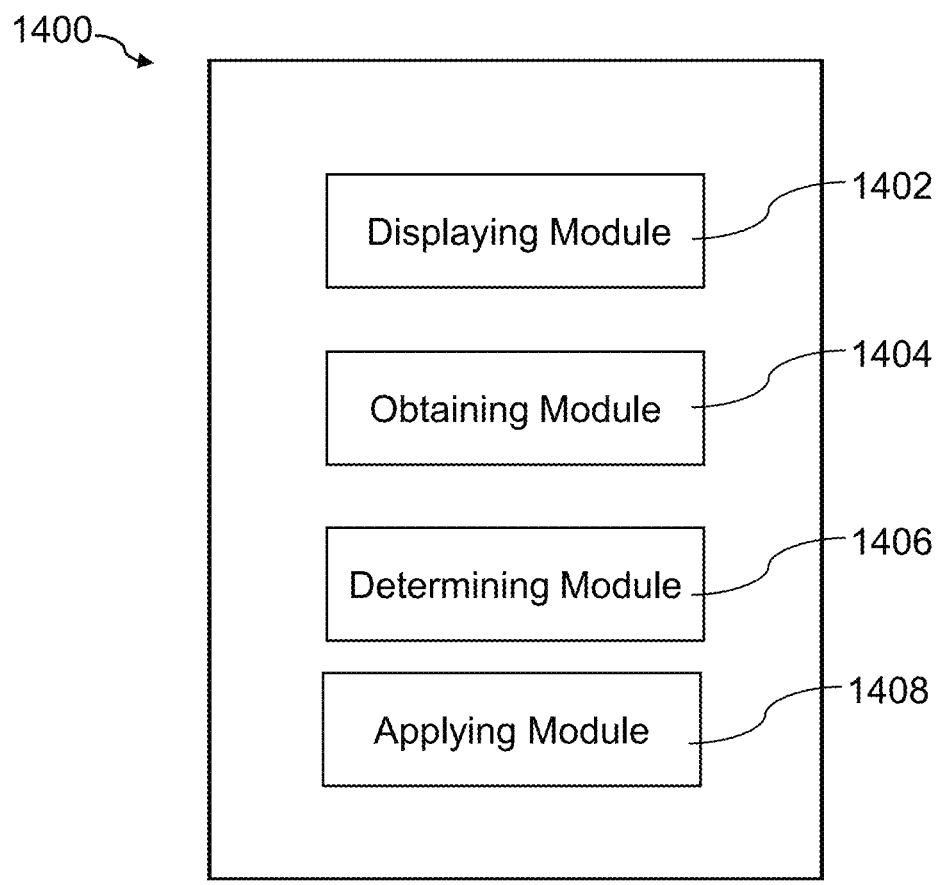

FIG. 14 depicts examples of modules of an apparatus 1400 in accordance with one or more implementations of the present disclosure. The apparatus 1400 can be an example of an implementation of a system configured to perform spoof testing, e.g., including transforming images. The apparatus 1400 can correspond to one or more of the implementations described above, and the apparatus 1400 includes the following. A displaying module 1402 causes a first display device to display one or more calibration patterns. An obtaining module 1404 obtains one or more first images displayed on the first display device. In some implementations, each of the one or more first images includes a corresponding calibration pattern of the one or more calibration patterns. In some implementations, the one or more first images are captured by an image capture device disposed at a non-zero capture angle with respect to the first display device. A determining module 1406 determines, based on the one or more first images, a transformation to be applied to account for the non-zero capture angle. The obtaining module 1404 obtains a second image of a human user. An applying module 1408 applies the transformation to the second image to generate a transformed spoof representation of the human user for capture by the image capture device being held at the non-zero capture angle with respect to the display device. The displaying module 1402 causes the first display device to display the transformed spoof representation.

In some implementations, the transformation causes the transformed spoof representation to appear to be the second image, from the perspective of the image capture device being held at the non-zero capture angle with respect to the display device.

In some implementations, determining the transformation includes determining a transformation matrix.

In some implementations, the transformation causes an apparent capture angle of the image capture device with respect to the first display device to be less than an actual capture angle of the image capture device with respect to the first display device.

In some implementations, the apparatus 1400 includes an identifying module that identifies a correspondence between a feature included in the one or more first images and a corresponding calibration pattern of the one or more calibration patterns.

In some implementations, causing the first display device to display the one or more calibration patterns includes causing the first display device to display a plurality of calibration patterns in sequence.

In some implementations, the determining module 1406 determines, based on the one or more first images, boundaries of a field of view of the image capture device.

In some implementations, determining the transformation includes determining a mapping between a field of view of the image capture device and locations on the first display device.

In some implementations, the mapping is between one or more corners of the field of view and one or more corresponding locations on the first display device.

In some implementations, the apparatus 1400 includes a moving module that causes movement of the image capture device with respect to the first display device based on the one or more first images.

Figure 15:
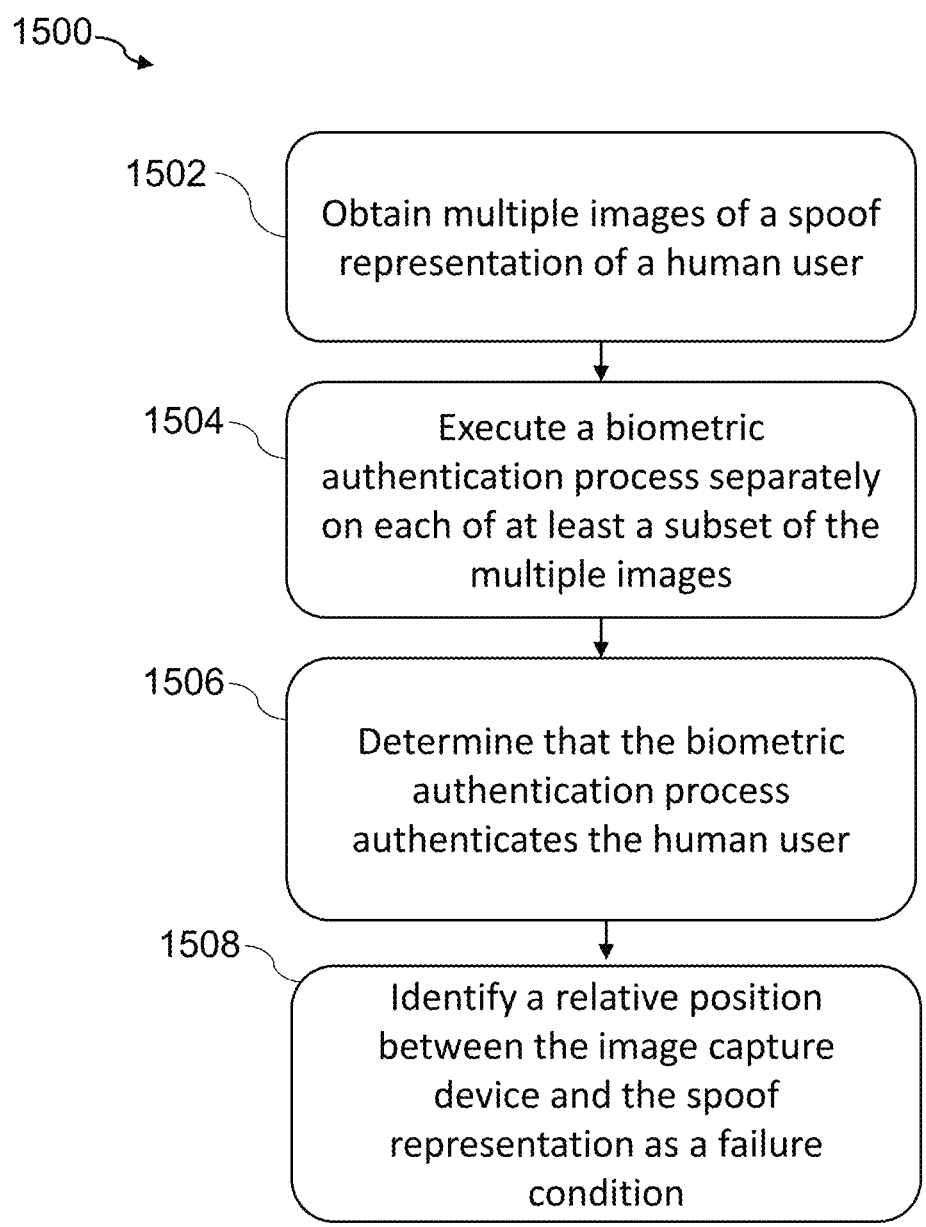
FIGS. 15-17 are flow diagrams showing examples of methods in according with one or more implementations of the present disclosure.

FIG. 15 shows an example method 1500 that may be performed according to some implementations disclosed herein. Multiple images of a spoof representation of a human user are obtained (1502). In some implementations, the multiple images are captured automatically by an image capture device, and each of the multiple images is captured at a different relative position between the image capture device and the spoof representation. A biometric authentication process is executed separately on each of at least a subset of the multiple images (1504). It is determined that the biometric authentication process authenticates the human user based on at least a first image from the subset (1506). A relative position between the image capture device and the spoof representation corresponding to the first image is identified as a failure condition associated with the biometric authentication process (1508).

Figure 16:
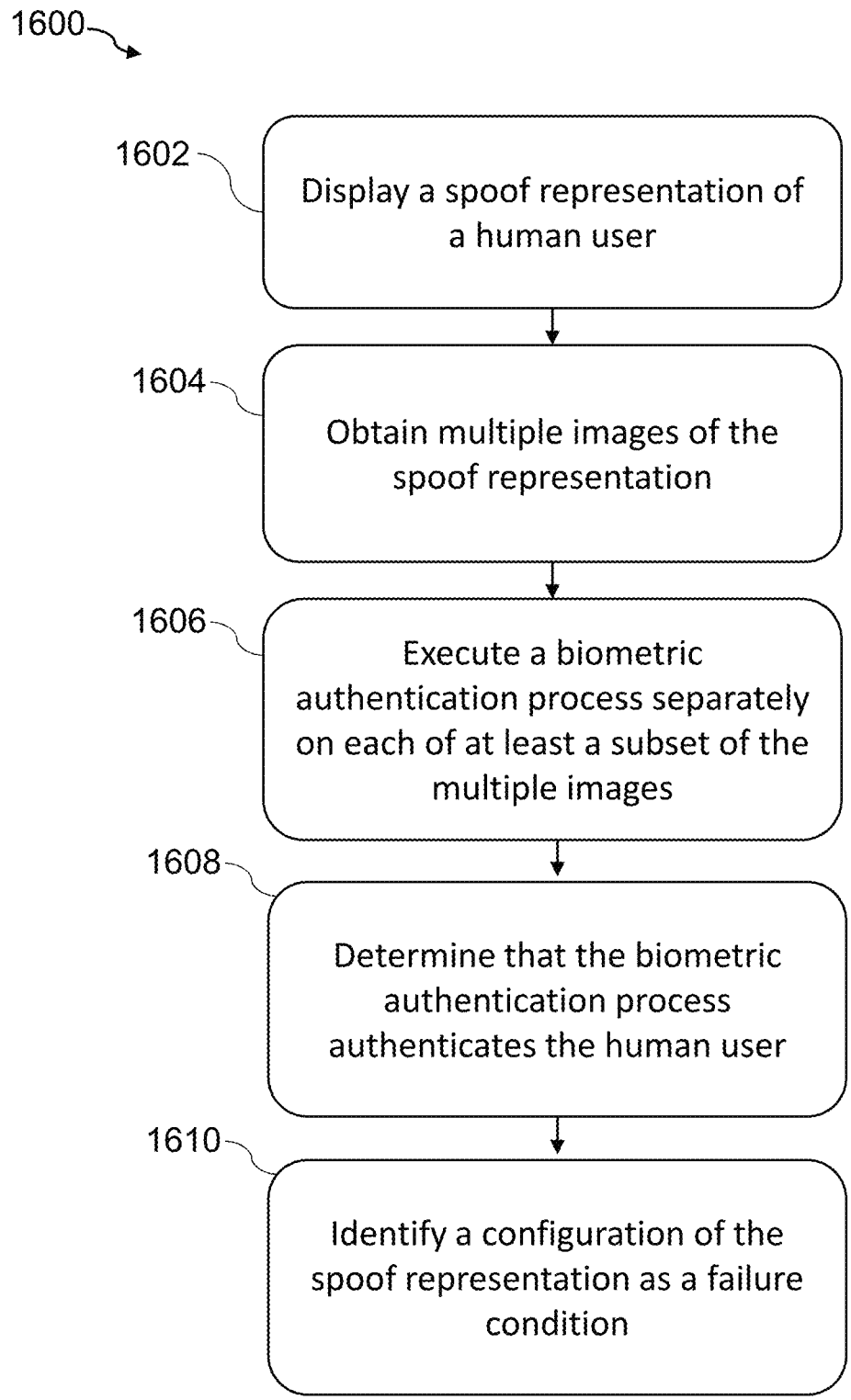

FIG. 16 shows another example method 1600 that may be performed according to some implementations disclosed herein. A first display device is caused to display a spoof representation of a human user (1602). Multiple images of the spoof representation are obtained (1604). In some implementations, the multiple images are captured automatically by an image capture device, and each of the multiple images captures a different corresponding configuration of the spoof representation displayed on the first display device. A biometric authentication process is executed separately on each of at least a subset of the multiple images (1606). It is determined that the biometric authentication process authenticates the human user based on at least a first image from the subset (1608). A configuration of the spoof representation corresponding to the first image is identified as a failure condition associated with the biometric authentication process (1610).

Figure 17:
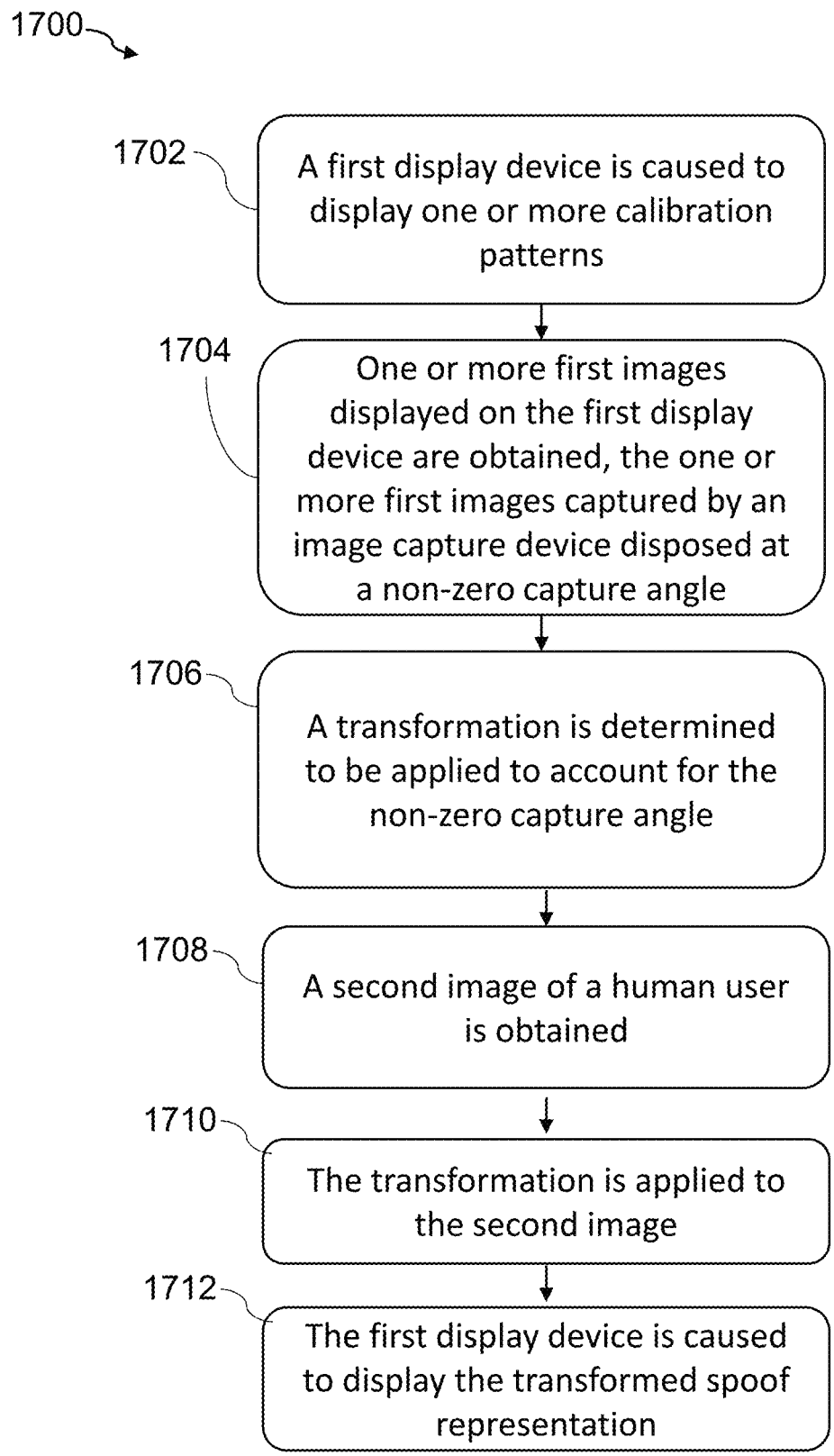

FIG. 17 shows another example method 1700 that may be performed according to some implementations disclosed herein. A first display device is caused to display one or more calibration patterns (1702). One or more first images displayed on the first display device are obtained, each of the one or more first images including a corresponding calibration pattern of the one or more calibration patterns (1704). In some implementations, the one or more first images are captured by an image capture device disposed at a non-zero capture angle with respect to the first display device. Based on the one or more first images, a transformation is determined to be applied to account for the non-zero capture angle (1706). A second image of a human user is obtained (1708). The transformation is applied to the second image (1710) to generate a transformed spoof representation of the human user for capture by the image capture device being held at the non-zero capture angle with respect to the display device. The first display device is caused to display the transformed spoof representation (1712).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
    causing, by one or more processing devices, a first display device to display a spoof representation of a human user;
    obtaining, by the one or more processing devices, multiple images of the spoof representation, wherein the multiple images are captured automatically by an image capture device, and wherein each of the multiple images captures a different corresponding configuration of the spoof representation displayed on the first display device;
    executing, by the one or more processing devices, a biometric authentication process separately on each of at least a subset of the multiple images;
    determining, by the one or more processing devices, that the biometric authentication process authenticates the human user based on at least a first image from the subset; and
    identifying, by the one or more processing devices, a configuration of the spoof representation corresponding to the first image as a failure condition associated with the biometric authentication process.

2. The computer-implemented method of claim 1, wherein the different corresponding configurations comprise at least one of: a zoom level of the spoof representation, a position of the spoof representation on the first display device, an action performed by the spoof representation, or a lighting environment of the spoof representation.

3. The computer-implemented method of claim 1, wherein the different corresponding configurations comprise at least one of: a brightness of the display, a contrast of the display, or a color temperature of the display.

4. The computer-implemented method of claim 1, comprising obtaining, by the one or more processing devices, an image of the image capture device, wherein the different corresponding configurations of the spoof representation are based on the image of the image capture device.

5. The computer-implemented method of claim 4, wherein the image capture device comprises a second display device, and wherein the first display device comprises one or more marking features, the method comprising:
    identifying, by the one or more processing devices, a field of view of the image capture device displayed on the second display device in the image of the image capture device; and
    setting, by the one or more processing devices, one of the different corresponding configurations based on a position of the one or more marking features in the field of view.

6. The computer-implemented method of claim 4, wherein the image capture device comprises a second display device, the method comprising:
    identifying, by the one or more processing devices, authentication instructions displayed on the second display device in the image of the image capture device; and
    setting, by the one or more processing devices, one of the different corresponding configurations based on the identified authentication instructions.

7. The computer-implemented method of claim 1, comprising causing, by the one or more processing devices, a robotic manipulator to interact with the image capture device, wherein the interaction causes the image capture device to capture the first image.

8. A spoof simulation system comprising:
    a first display device;
    an image capture device; and
    a computer system configured to perform operations comprising:
        causing the first display device to display a spoof representation of a human user;
        obtaining multiple images of the spoof representation, wherein the multiple images are captured automatically by the image capture device, and wherein each of the multiple images captures a different corresponding configuration of the spoof representation displayed on the first display device;
        executing a biometric authentication process separately on each of at least a subset of the multiple images;
        determining that the biometric authentication process authenticates the human user based on at least a first image from the subset; and
        identifying a configuration of the spoof representation corresponding to the first image as a failure condition associated with the biometric authentication process.

9. The system of claim 8, wherein the different corresponding configurations comprise at least one of: a zoom level of the spoof representation, a position of the spoof representation on the first display device, an action performed by the spoof representation, or a lighting environment of the spoof representation.

10. The system of claim 8, wherein the different corresponding configurations comprise at least one of: a brightness of the display, a contrast of the display, or a color temperature of the display.

11. The system of claim 8, wherein the operations comprise obtaining an image of the image capture device, wherein the different corresponding configurations of the spoof representation are based on the image of the image capture device.

12. The system of claim 11, wherein the image capture device comprises a second display device, and wherein the first display device comprises one or more marking features, the operations comprising:
identifying a field of view of the image capture device displayed on the second display device in the image of the image capture device; and
setting one of the different corresponding configurations based on a position of the one or more marking features in the field of view.

13. The system of claim 11, wherein the image capture device comprises a second display device, the operations comprising:
identifying authentication instructions displayed on the second display device in the image of the image capture device; and
setting one of the different corresponding configurations based on the identified authentication instructions.

14. The system of claim 8, wherein the operations comprise causing a robotic manipulator to interact with the image capture device, wherein the interaction causes the image capture device to capture the first image.

15. A non-transitory, computer-readable storage medium storing one or more instructions that, when executed by a computer system, cause the computer system to perform operations comprising:
causing a first display device to display a spoof representation of a human user;
obtaining multiple images of the spoof representation, wherein the multiple images are captured automatically by an image capture device, and wherein each of the multiple images captures a different corresponding configuration of the spoof representation displayed on the first display device;
executing a biometric authentication process separately on each of at least a subset of the multiple images;
determining that the biometric authentication process authenticates the human user based on at least a first image from the subset; and
identifying a configuration of the spoof representation corresponding to the first image as a failure condition associated with the biometric authentication process.

16. The non-transitory, computer-readable storage medium of claim 15, wherein the different corresponding configurations comprise at least one of: a zoom level of the spoof representation, a position of the spoof representation on the first display device, an action performed by the spoof representation, or a lighting environment of the spoof representation.

17. The non-transitory, computer-readable storage medium of claim 15, wherein the different corresponding configurations comprise at least one of: a brightness of the display, a contrast of the display, or a color temperature of the display.

18. The non-transitory, computer-readable storage medium of claim 15, wherein the operations comprise obtaining an image of the image capture device, wherein the different corresponding configurations of the spoof representation are based on the image of the image capture device.

19. The non-transitory, computer-readable storage medium of claim 18, wherein the image capture device comprises a second display device, and wherein the first display device comprises one or more marking features, the operations comprising:
identifying a field of view of the image capture device displayed on the second display device in the image of the image capture device; and
setting one of the different corresponding configurations based on a position of the one or more marking features in the field of view.

20. The non-transitory, computer-readable storage medium of claim 18, wherein the image capture device comprises a second display device, the operations comprising:
identifying authentication instructions displayed on the second display device in the image of the image capture device; and
setting one of the different corresponding configurations based on the identified authentication instructions.

* * * * *